(12) United States Patent
Wade

(10) Patent No.: US 11,156,236 B2
(45) Date of Patent: Oct. 26, 2021

(54) BALL VALVE WITH PRESSURE ABSORBING ACCUMULATOR

(71) Applicant: Dril-Quip, Inc., Houston, TX (US)

(72) Inventor: Morris B. Wade, Houston, TX (US)

(73) Assignee: Dril-Quip, Inc., Houston, TX (US)

( * ) Notice: Subject to any disclaimer, the term of this patent is extended or adjusted under 35 U.S.C. 154(b) by 0 days.

(21) Appl. No.: 16/722,910

(22) Filed: Dec. 20, 2019

(65) Prior Publication Data
US 2020/0124058 A1 Apr. 23, 2020

Related U.S. Application Data

(63) Continuation-in-part of application No. 15/582,268, filed on Apr. 28, 2017, now Pat. No. 10,527,207.

(60) Provisional application No. 62/432,444, filed on Dec. 9, 2016.

(51) Int. Cl.
| E21B 33/038 | (2006.01) |
| E21B 34/04 | (2006.01) |
| F15B 1/027 | (2006.01) |
| F15B 1/04 | (2006.01) |
| F16K 15/18 | (2006.01) |

(52) U.S. Cl.
CPC ............ *F15B 1/027* (2013.01); *F15B 1/04* (2013.01); *F16K 15/183* (2013.01)

(58) Field of Classification Search
CPC ........ E21B 33/038; E21B 34/04; F15B 1/027; F15B 1/04; F16K 15/183
See application file for complete search history.

(56) References Cited

U.S. PATENT DOCUMENTS

| 2,979,070 A | * | 4/1961 | Payne ................. F15B 1/24 137/192 |
| 3,321,217 A | | 5/1967 | Ahlstone |
| 3,325,190 A | | 6/1967 | Eckert et al. |
| 3,350,103 A | | 10/1967 | Ahlstone |

(Continued)

FOREIGN PATENT DOCUMENTS

| GB | 2186043 A | 8/1987 |
| GB | 2482395 A | 2/2012 |

OTHER PUBLICATIONS

Search report issued in related UK application No. GB1718849.1, dated Mar. 15, 2018, 4 pages.

(Continued)

*Primary Examiner* — Matthew R Buck
(74) *Attorney, Agent, or Firm* — Baker Botts L.L.P.

(57) ABSTRACT

A ball valve assembly including a fluid storage mechanism (e.g., accumulator) that absorbs excess fluid pressure vented through a communication port is provided. The ball valve assembly includes a housing with a fluid passage formed therethrough, a seat located in the fluid passage, and an inlet of the fluid passage on a first side of the seat for coupling the ball valve assembly to the communication port. The ball valve assembly includes a ball with a bore formed therethrough. The ball is positioned in the seat and rotatably movable between an open position allowing flow through the fluid passage and a closed position preventing flow through the fluid passage. The ball valve assembly also includes an accumulator disposed in the housing and fluidly coupled to the first fluid passage on a second side of the seat opposite the first side.

24 Claims, 19 Drawing Sheets

(56) References Cited

U.S. PATENT DOCUMENTS

| | | |
|---|---|---|
| 3,350,104 A | 10/1967 | Hynes |
| 3,719,070 A | 3/1973 | Hanes |
| 4,214,763 A | 7/1980 | Latham |
| 4,433,859 A | 2/1984 | Driver et al. |
| 4,496,172 A | 1/1985 | Walker |
| 4,526,406 A | 7/1985 | Nelson |
| 4,708,376 A | 11/1987 | Jennings et al. |
| 4,902,044 A | 2/1990 | Williams et al. |
| 4,941,691 A | 7/1990 | Reimert |
| 5,039,140 A | 8/1991 | Szymczak |
| 5,103,915 A | 4/1992 | Sweeney et al. |
| 5,255,743 A | 10/1993 | Adam et al. |
| 5,634,671 A | 6/1997 | Watkins |
| 5,755,287 A | 5/1998 | Cain et al. |
| 6,138,762 A | 10/2000 | Sweeney et al. |
| 6,409,176 B2 | 6/2002 | Allen |
| 6,824,171 B2 | 11/2004 | Milberger et al. |
| 7,025,360 B2 | 4/2006 | Walker et al. |
| 7,614,453 B2 | 11/2009 | Spiering et al. |
| 8,096,560 B2 | 1/2012 | Pallini, Jr. et al. |
| 9,169,710 B2 | 10/2015 | Jahnke |
| 9,222,609 B1 | 12/2015 | Lee |
| 9,822,604 B2 * | 11/2017 | van Wijk ............... E21B 33/076 |
| 2001/0045711 A1 | 11/2001 | Johnson |
| 2003/0000694 A1 | 1/2003 | Sweeney et al. |
| 2005/0082764 A1 | 4/2005 | Smith, III |
| 2005/0126788 A1 | 6/2005 | Crozier |
| 2006/0277904 A1 * | 12/2006 | Weber ...................... F15B 1/24 |
| | | 60/413 |
| 2007/0169940 A1 | 7/2007 | Fenton et al. |
| 2009/0322029 A1 | 12/2009 | Pallini, Jr. et al. |
| 2012/0073668 A1 * | 3/2012 | Bold ........................ F15B 1/165 |
| | | 137/1 |
| 2018/0163902 A1 | 6/2018 | Manning et al. |
| 2020/0182365 A1 * | 6/2020 | Pellini ................. F02M 59/466 |

OTHER PUBLICATIONS

Search report issued in related UK application No. GB1900329.2, dated Apr. 5, 2019, 5 pages.

Search report issued in related UK application No. GB1900330.0 dated Apr. 9, 2019, 5 pages.

Search Report issued in related United Kingdom Patent Application No. GB2018600.3, dated May 26, 2021, 2 pages.

* cited by examiner

BALL VALVE WITH PRESSURE ABSORBING ACCUMULATOR

CROSS REFERENCE TO RELATED APPLICATION

The present application is a Continuation In Part of U.S. application Ser. No. 15/582,268 entitled "High Capacity Universal Connector", filed on Apr. 28, 2017, which claims the benefit of U.S. Provisional Application Ser. No. 62/432,444, entitled "High Capacity Universal Connector", filed on Dec. 9, 2016.

TECHNICAL FIELD

Embodiments described herein relate generally to oil and gas production and drilling operations, and specifically to increased surface area at the interfacing surfaces of housings and associated connectors, improved gaskets, and gasket retention devices that enable the same.

BACKGROUND

A subsea well has a housing located at the subsea floor. The housing is defined by a tubular member having a bore. A connector may be a similarly tubular member with a bore. The connector may be lowered from a vessel, located at the surface, toward the housing, where the connector may connect the subsea housing to the surface by coupling to the exterior of the housing. The housing may further comprise one or more upward-facing shoulders on its upper end that are operable to interface with one or more downward-facing shoulders on the lower end of the connector. The connector main body may comprise a recess located radially inward from one of the downward-facing shoulders. Both the housing and connector may comprise a grooved profile on their outer diameter to enable a locking ring to couple the housing and connector together to create a final assembly.

A metal seal ring, or gasket, may be positioned between the tubular members and flexibly seal between the members. Gaskets are available in a variety of configurations, including AX, BX, CX, DX, RX, and VX types. A gasket may comprise an upper conical surface and a lower conical surface that are operable to create a seal when the upper conical surface of the gasket comes into contact with a downward-facing conical surface of the connector and the lower conical surface of the gasket comes into contact with the upward-facing conical surface of the housing. Such gaskets are often constructed having one or more ribs, which extend radially outward from the gasket. The one or more ribs may enable alignment of the gasket and may interact with a retention device to maintain the gasket's position between the tubular members during operations.

One problem with gaskets including one or more ribs is that the ribs are designed to interface with a recess formed within or between the tubular members. This recess reduces the surface area of the tubular members, as well as the area of the interface between the tubular members. If the recess appears in the housing or in the connector of a wellhead assembly, the recess may weaken the assembly, such that it may be more susceptible to the forces associated with bending and compressing the assembly. High pressure/high temperature (HP/HT) subsurface drilling, with temperatures reaching and exceeding 350° F. and pressures reaching and exceeding 15,000 PSI, imposes particularly high demands on all elements of the assembly. Therefore, any reduction in the strength, flexibility, or both of the assembly may impact operational capacity of the assembly and may lead to undesirable results when the assembly is subjected to loads seen in challenging subsea and other environments.

The present invention is designed to increase the interface of the surface area of the housing and connector at the shoulders of these tubular members and thereby increase the load that the connected tubular members can withstand from wellbore pressures and temperatures.

BRIEF DESCRIPTION OF THE DRAWINGS

Some specific exemplary embodiments of the disclosure may be understood by referring, in part, to the following description and the accompanying drawings.

DETAILED DESCRIPTION

Figure 1:
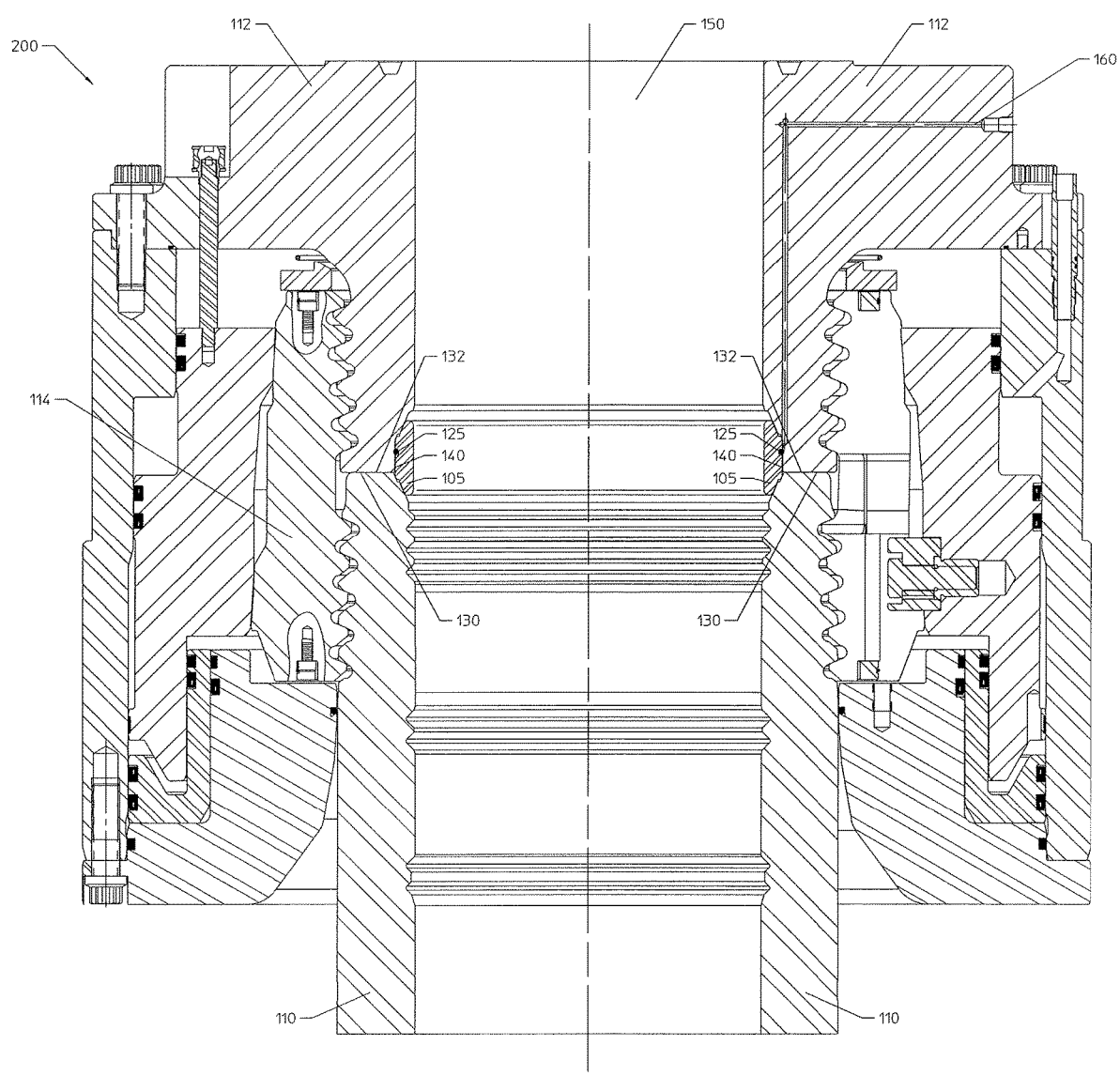
FIG. 1 is a side cross sectional view of an assembly comprising a housing, a connector, a gasket, and a locking ring, according to one or more aspects of the present disclosure.

The present invention overcomes one or more deficiencies in the prior art by providing systems and methods for increasing the interfacing surface area of tubular members, including but not limited to subsea housing assemblies, which may include wellheads, spools, adapters, and blow out preventer connections.

In one or more embodiments, the surface area of the tubular members may be increased by removing one or more ribs extending from the gasket. Similarly, the gasket may be reduced in size and thickness to enable an increase in the interfacing surface areas of the tubular members. For example, the contact area of the tubular members may be increased by between 10% and 40% compared to existing designs by removing the one or more ribs from the gasket, which may proportionally increase the bending and compression capacity of the complete assembly by 10% up to 40%.

The gasket may be aligned between the tubular members by tapered distal alignment segments near the vertical extremities of the gasket and radially central alignment segments on the gasket. In certain embodiments, the gasket may include both distal and radially central alignment segments operable to engage the conical segments of the tubular members and ensure alignment of the gasket. In other embodiments, the gasket may include the distal alignment segments but not the radially central alignment segments, while in still further embodiments, the gasket may include the radially central alignment segments but not the distal alignment segments. The gasket may further include a split ring, a tab configuration, and/or other configurations that would be familiar to one of ordinary skill in the art.

Embodiments according to the present disclosure are also directed to an improved connector/wellhead gasket retention assembly. Unlike existing gasket retention systems, the disclosed assembly does not require a large recess formed through the tubular housing or connector. Instead, the disclosed gasket retention assembly has a small footprint that helps to minimize impact to the wellhead/connector capacity by ensuring a large contact surface at the interface of the housing and connector.

The gasket retention assembly generally includes a port formed through the tubular connector, a spring loaded plunger disposed in a recess of the connector, this recess being fluidly coupled to the port, and a spring loaded retention mechanism that the plunger passes through. The spring loaded retention mechanism interfaces directly with a gasket of the tubular assembly to hold the gasket in position against the wellhead connector. The spring loaded retention mechanism may be oriented perpendicular to the spring loaded plunger. The gasket retention assembly may also include a valve or other closure mechanism disposed at a distal end of the port to enable specific hydraulic control of the gasket retention assembly. The gasket retention assembly is self-energizing and can be operated hands free (e.g., automatically or via hydraulic control inputs from an ROV or control line) to selectively engage/disengage the gasket from the retention mechanism. This allows for relatively easy removal and replacement of the gasket from the wellhead assembly at the subsea location using an ROV.

The present disclosure is also directed to a ball valve assembly that may be used in conjunction with the gasket retention assembly. The ball valve assembly includes a fluid storage mechanism (e.g., accumulator) that absorbs excess fluid pressure vented through the communication port of the gasket retention assembly when the ball valve is in an open position. When the ball valve assembly is closed, the communication port through the gasket retention assembly is no longer able to vent to the ball valve assembly, and fluid pressure is trapped in the communication line so as to enable removal of the gasket from the connector as the gasket retention assembly is no longer engaging the gasket. The ball valve may be reopened upon replacement of the gasket, thereby allowing pressure communication between the communication port and the accumulator so that the gasket retention mechanism can reengage the gasket.

The disclosed ball valve assembly may include a housing having a first fluid passage formed therethrough, a seat disposed within the first fluid passage, and an inlet of the first fluid passage on a first side of the seat for fluidly coupling the ball valve assembly to a fluid communication line. The ball valve assembly may also include a ball with a bore formed therethrough, wherein the ball is positioned in the seat and rotatably movable between an open position allowing flow through the first fluid passage and a closed position preventing flow through the first fluid passage. The ball valve assembly also includes an accumulator disposed in the housing and fluidly coupled to the first fluid passage on a second side of the seat opposite the first side. The disclosed ball valve assembly provides a closed system through which fluid pressure can be vented from and returned to the communication port without having the port open to external fluid.

FIG. 1 is a diagram illustrating an assembly 200 including a housing 110, a connector 112, and a gasket 105, according to one or more aspects of the present disclosure. The assembly 200 may include a tubular housing 110 having a central bore 150 that may contact a tubular connector 112, where the connector 112 also has a central bore 150. The housing 110 and connector 112 may be secured by a locking ring 114. The locking ring 114 may surround the housing 110 and connector main body 112. The gasket 105 may include a conical upward facing surface, a conical downward facing surface, and a central bore 150. The gasket 105 may create a seal when the conical upward facing surface of the gasket 105 contacts a conical downward-facing shoulder of the connector 112 and the conical downward-facing surface of the gasket 105 contacts a conical upward-facing shoulder of the housing 110. A retention device 125 may reside in a recess in the gasket 105. The retention device 125, which may include an elastomeric seal (such as an o-ring, s-seal, polypak, or t-seal), a plunger, or a mechanical, hydraulic, or auto-release configuration of retention device, may operate to maintain the position of the gasket 105. As illustrated in FIG. 1, a blowout valve 160 may pass through the connector 112 to allow air or fluid pressure to build behind the retention device 125 to dislodge the retention device 125 and the gasket 105. The reduced size of the gasket 105, with respect to prior implementations, may enable contact between the entire downward-facing shoulder 132 of the connector 112 and the entire upward-facing shoulder 130 of the housing 110. The increased surface area contact between the housing 110 and the connector 112 at the interface between these components increases the strength, flexibility, or both of the assembly 100.

Figure 2:
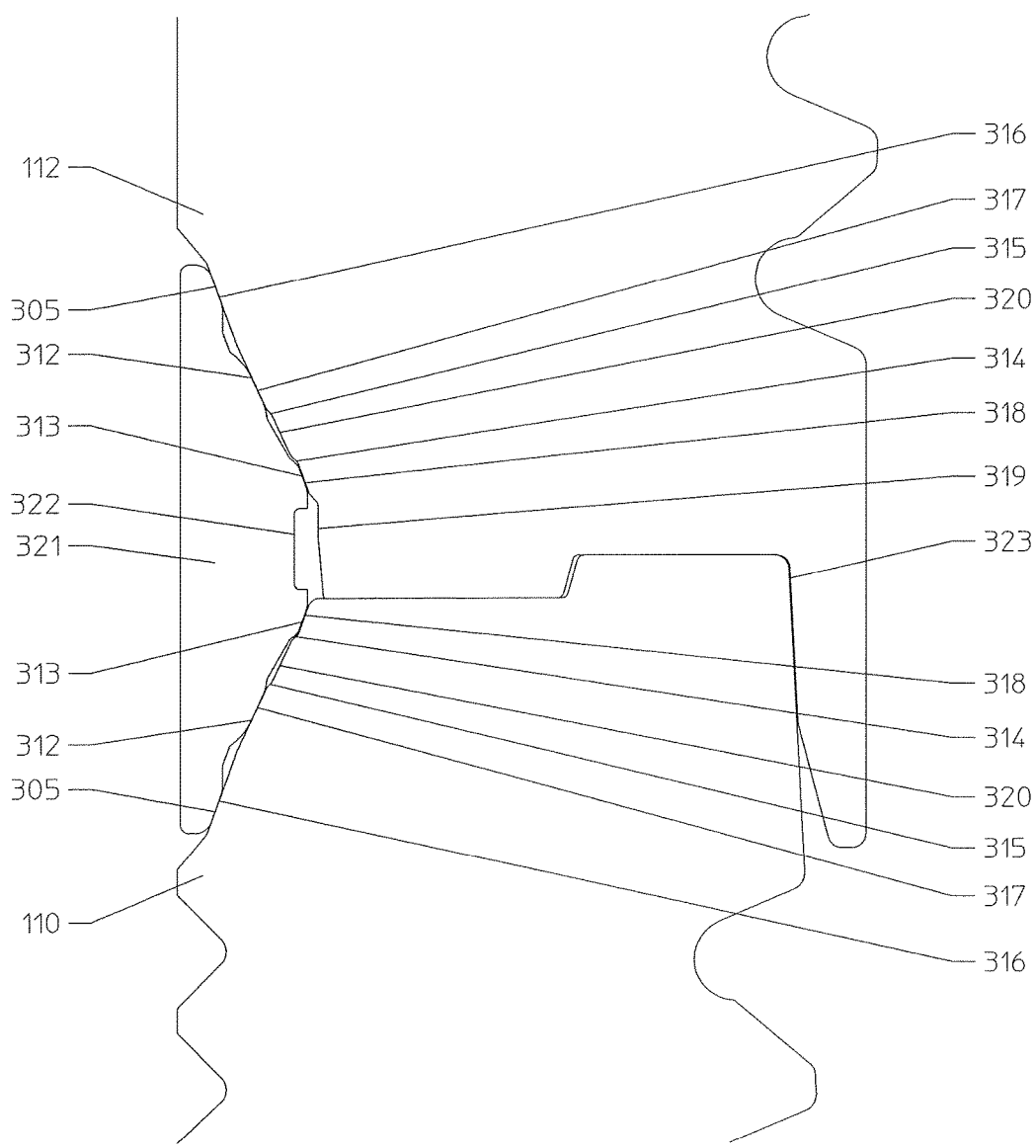
FIG. 2 is a side cross sectional view of an assembly comprising a housing, a connector, and a gasket, according to one or more aspects of the present disclosure.

In one or more embodiments, the conical surfaces of the tubular members may include multiple conical surfaces separated by steps, or transitions, between the conical surfaces. These steps may provide a visual indication to the operator for properly seating the gasket. Alternatively, the multiple sealing surfaces may act redundantly to prevent leaks in the event a single seal fails. Alternatively, one or more of these surfaces may act to help align the gasket instead of, or in addition to, acting as sealing surfaces. FIG. 2 illustrates such an embodiment. The housing 110 and the connector 112 may each include multiple surfaces 316, 317, 318, and 320 separated by steps 314 and 315 therebetween. Although four conical surfaces 316, 317, 318, and 320 are shown on each of the housing 110 and the connector 112, other numbers or arrangements of these conical surfaces may be utilized. The gasket 305 may include multiple conical sealing segments 311, 312, and 313 for sealing the gasket 305 against each of the housing 110 and the connector 112. For example, the conical sealing segments 312 of the gasket 305 may generally seal against the conical surfaces 317 of the housing 110 and connector 112, while the conical sealing segments 311 of the gasket 305 may generally seal against the conical surfaces 316 of the housing 110 and connector 112. Furthermore, conical sealing segments 313 of the gasket 305 may generally seal against the conical surfaces 318 of the housing 110 and connector 112. One or more of conical gasket surfaces 311, 312, and 313 may alternatively, or additionally, act to aid in alignment of the gasket 305 during installation of the gasket 305 and/or actuation of the connector. The connector 112 may include a straight vertical section 319 along its internal diameter. This straight vertical section 319, as shown, may be located between the conical surfaces 316, 317, 318, and 320 of the housing 110 and the connector 112 when the housing 110 and connector 112 are coupled together.

Figure 4:
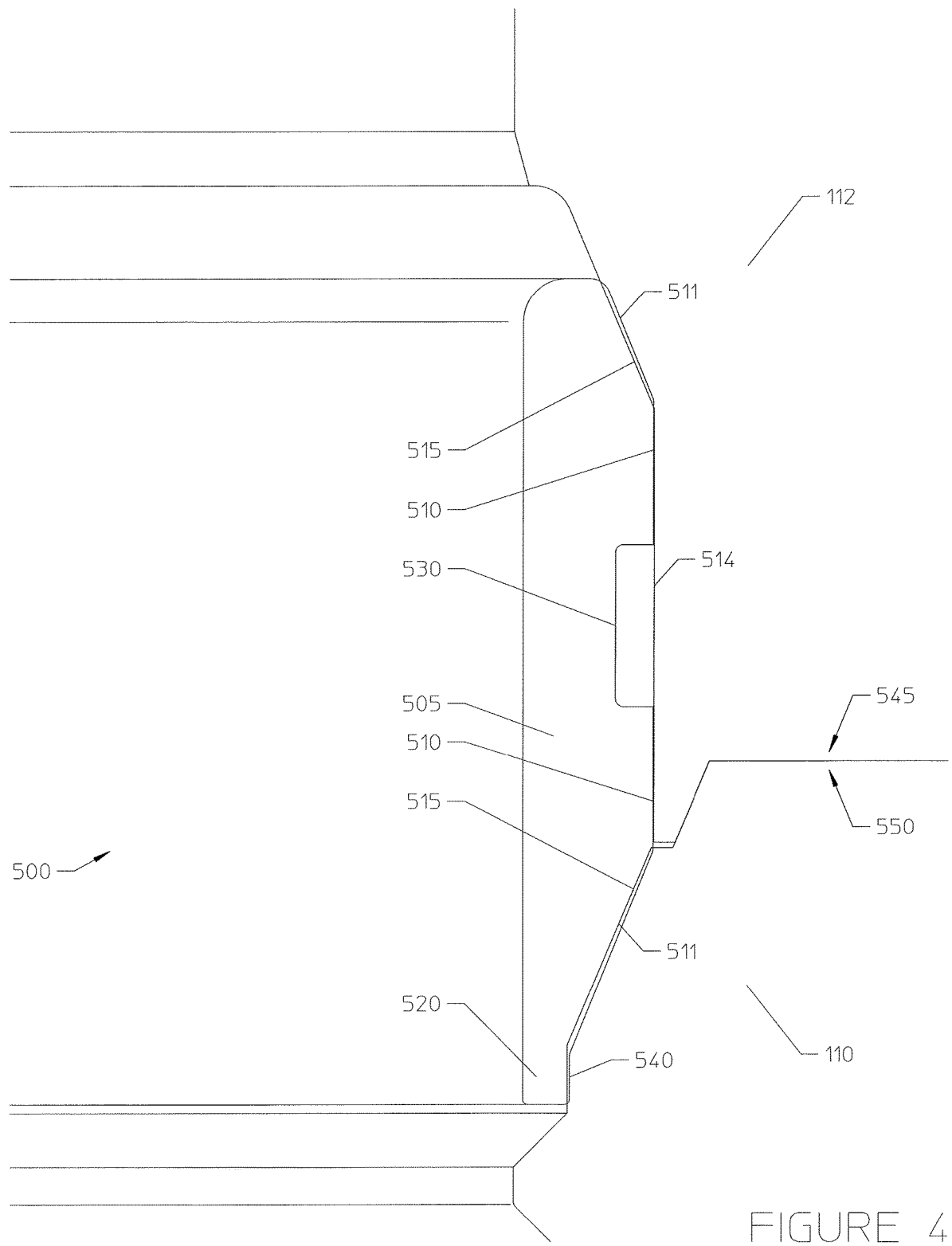
FIG. 4 is a side cross sectional view of an assembly comprising a housing, a connector, and a gasket, according to one or more aspects of the present disclosure.

The connector 112 may further include a tapered segment 321. The tapered segment 321 may aid in alignment of the connector 112 with respect to the housing 110. The tapered segment 321 of the connector 112 may interface with one or more of the conical gasket surfaces 311, 312, or 313 during actuation to aid in alignment of the gasket 305. In other embodiments, the connector 112 may not include the tapered segment but instead just the straight vertical section (e.g., as shown in FIG. 4 having vertical section 514). In such instances, the straight vertical section 514 of the connector 112 may extend all the way down and interface directly with one of the conical surfaces (e.g., 511) of the housing 110.

Furthermore, the gasket 305 may be designed in such a way to protect the sealing surfaces 320 of the housing 110 and connector 112 for use with other types of gaskets that can utilize these surfaces 320 for sealing. The gasket 305 is operable to increase surface area contact between the housing 110 and the connector 112 at the interface between the tubular members and to create a seal at said interface. The interface between the housing 110 and the connector 112 may be shaped with an alignment feature 323 designed to aid in alignment of the connector 112 with the housing 110 during installation of the connector 112 onto the housing 110. The alignment feature 323 may generally include a concave portion of the connector configured to be received over a complementary shaped convex portion of the housing 110. The alignment feature 323 may be specifically designed to ensure alignment of the connector 112 with the housing 110 prior to the gasket 305 being energized.

Figure 3:
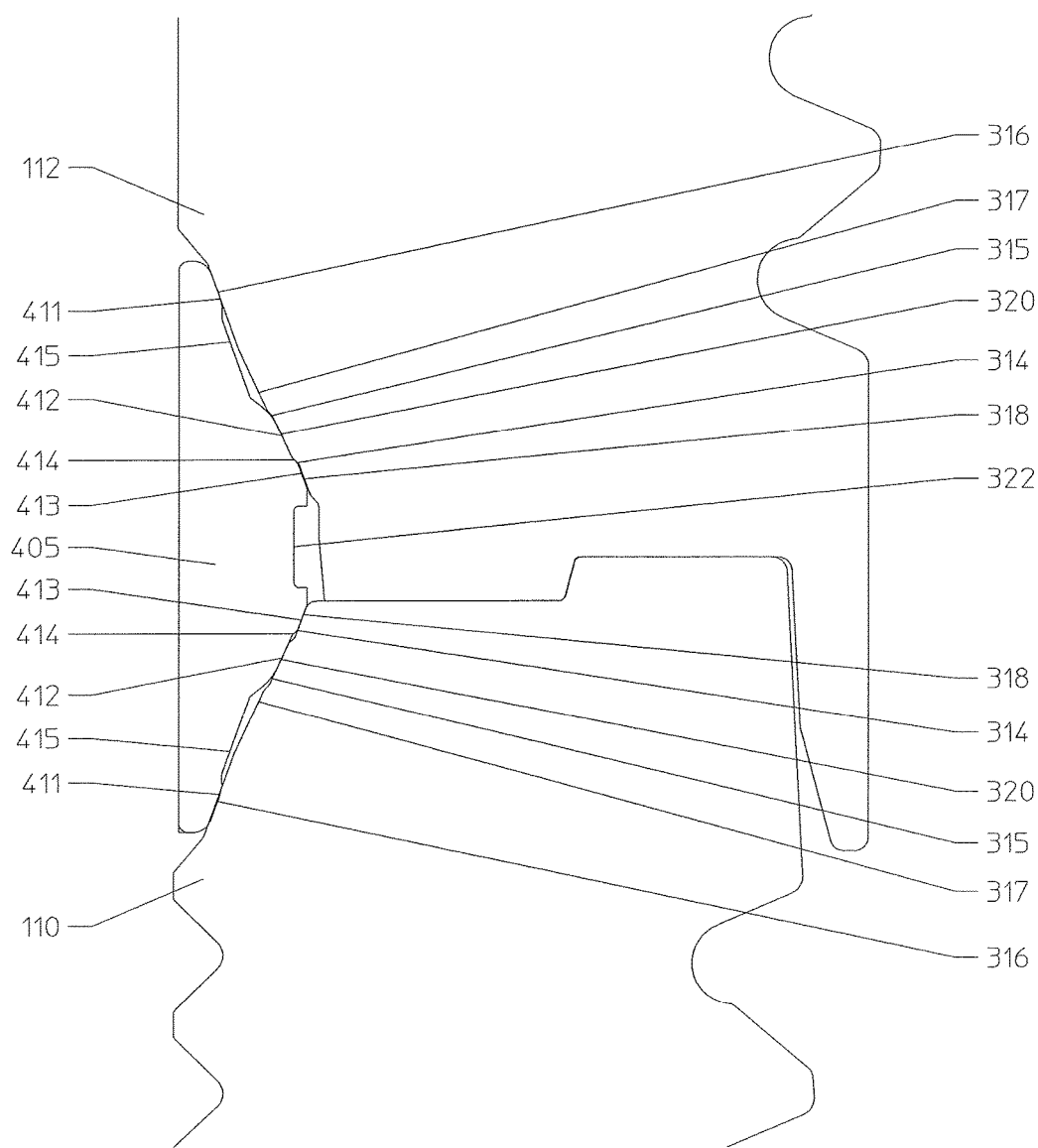
FIG. 3 is a side cross sectional view of an assembly comprising a housing, a connector, and a gasket, according to one or more aspects of the present disclosure.

FIG. 3 illustrates another embodiment of the housing, connector, and gasket of the present disclosure, which may increase the surface area contact between the housing 110 and the connector 112 at the interface between the two components. As shown, the housing 110 and connector 112 may each include similarly shaped surfaces 314, 315, 316, 317, 318, and 320 as those described above. Similar to the gasket 305 of FIG. 2, the gasket 405 of FIG. 3 may include multiple conical sealing segments 411, 412, 413 for sealing the gasket 405 against each of the housing 110 and the connector 112. For example, the conical sealing segments 412 of the gasket 405 may generally seal against the conical surfaces 320 of the housing 110 and connector 112, while the conical sealing segments 411 of the gasket 405 may generally seal against the conical surfaces 316 of the housing 110 and connector 112. Furthermore, conical sealing segments 413 of the gasket 405 may generally seal against the conical surfaces 318 of the housing 110 and connector 112. One or more of the conical gasket surfaces 411, 412, and 413 may alternatively, or additionally, act to aid in alignment of the gasket 405 during installation of the gasket 405 and/or actuation of the connector 112. Furthermore, the gasket 405 may be designed in such a way as to protect the sealing surfaces 317 of the housing 110 and connector 112 for use with other types of gaskets that may utilize the surface for sealing. The gasket 405 may further include a recess 430 located between the vertical sealing elements 410. The recess 430 may be operable to receive a retention device (not shown). The gasket 405 may also include additional recesses 415 formed between adjacent sets of conical sealing segments 411 and 412, as shown.

FIG. 4 illustrates yet another embodiment of the housing, connector, and gasket of the present disclosure. The housing 110 and the connector 112 may each include one or more conical surfaces 511. The connector 112 may include a straight vertical section 514 along its internal diameter. This straight vertical section 514, as shown, may be located between the conical sealing surfaces 511 of the housing 110 and the connector 112 when the housing 110 and connector 112 are coupled together. The straight vertical section 514 of the connector 112 may interface directly with the conical sealing surface 511 of the housing 110. Like the gasket 405 of FIG. 3, the gasket 505 of FIG. 4 may include conical sealing segments 515, to seal against the conical surfaces 511 of the housing 110 and connector 112 vertical sealing segments 510 to seal against the vertical section 514 of the connector 112, and a recess 530. The recess 530 may generally be located between the two vertical sealing segments 510, as shown. The recess 530 may be operable to receive a retention device (not shown). The gasket 505 may further include an extension 520 that may remain in contact with a vertical section 540 of the housing 110.

As shown in FIG. 4, the end of the connector 112 facing the housing 110 may include a concave portion 545, and the end of the housing 110 facing the connector 112 may include a complementary convex portion 550. The concave portion 545 of the connector 112 may be shaped to fit directly over and around the convex portion 550 of the housing 110. This may help with aligning the connector 112 to the housing 110 while the connection is being made. The concave/convex portions may also facilitate a larger overall surface area of connection between the ends of the housing 110 and the connector 112.

Figure 5:
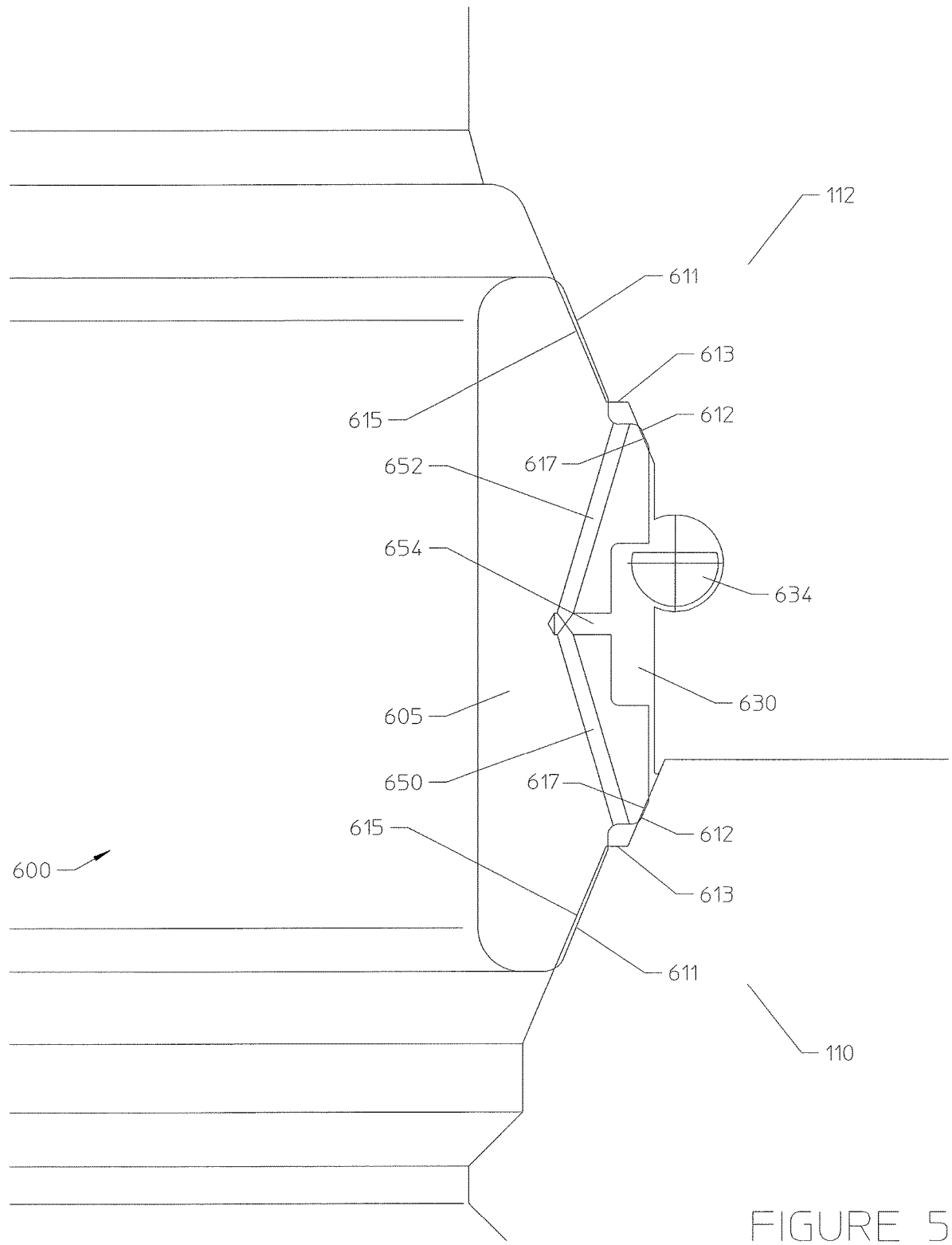
FIG. 5 is a side cross sectional view of an assembly comprising a housing, a connector, and a gasket, according to one or more aspects of the present disclosure.

FIG. 5 illustrates a further embodiment of the housing, connector, and gasket of the present invention. The housing 110 and the connector 112 may each include multiple conical surfaces 611, 612 separated by a step 613 therebetween. Although only two conical surfaces 611, 612 are shown on each of the housing 110 and the connector 112, other numbers or arrangements of these conical surfaces may be utilized. Like gasket 305 of FIG. 2, the gasket 605 of FIG. 5 may include multiple stepped sealing segments 615, 617 designed to interface directly with the corresponding conical surfaces 611, 612 of the housing 110 and connector 112. The gasket 605 may include a recess 603 formed therein between the opposing sets of conical sealing segments 615, 617. The recess 630 may be operable to receive a retention device 634. The retention device 634 may be mechanically, hydraulically, or pneumatically operated, and may be used to selectively maintain the position of the gasket 605 in position or to dislodge the gasket 605 so that it may be replaced. Example gasket retention assemblies that include such a retention device designed to interface with the recess 630 in the gasket 605 are described in greater detail below.

Figure 6:
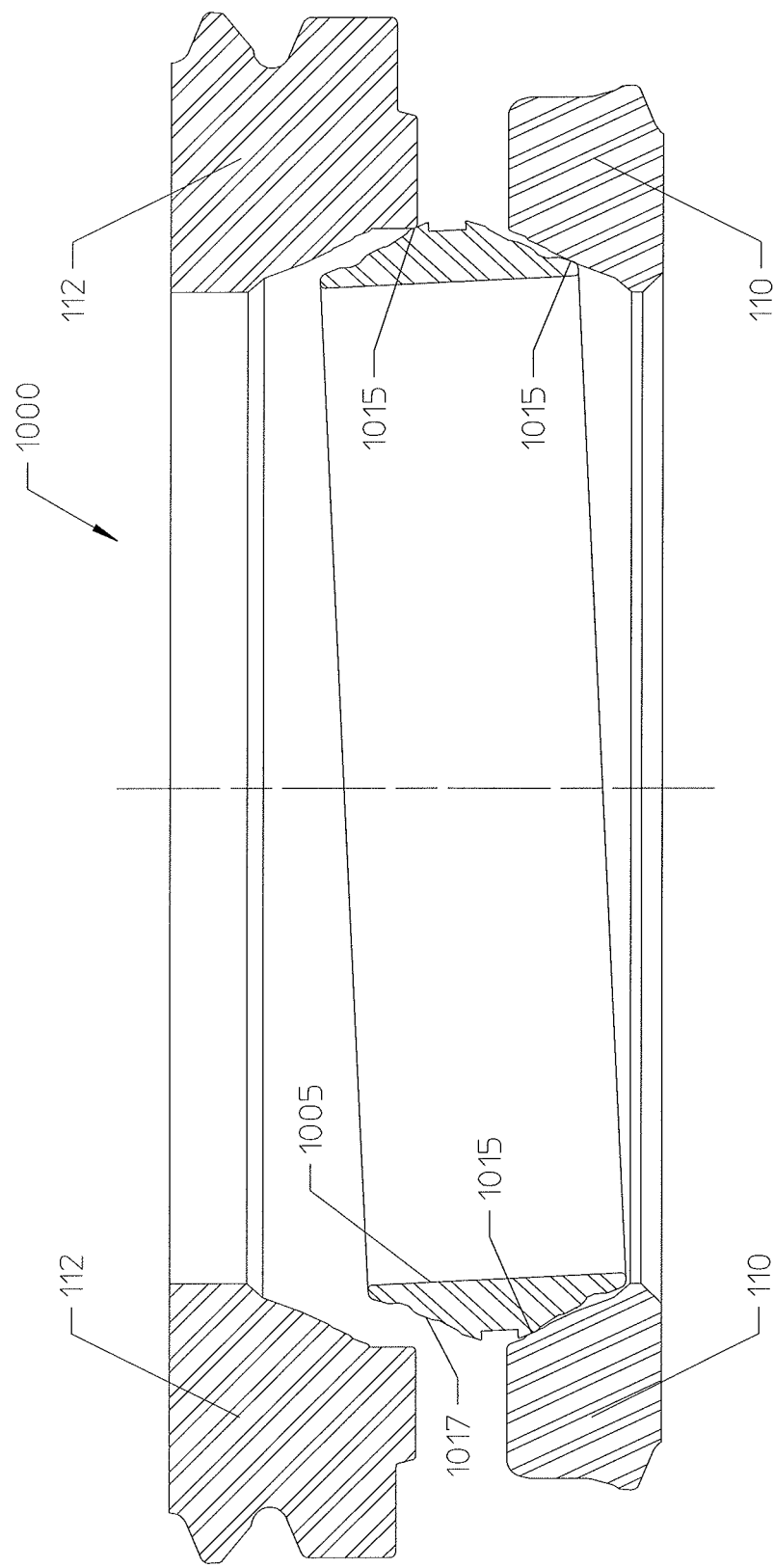
FIG. 6 is a side cross sectional view of a well assembly as a gasket moves into alignment and prior to contact between tubular members, according to one or more aspects of the present disclosure.
Figure 7:
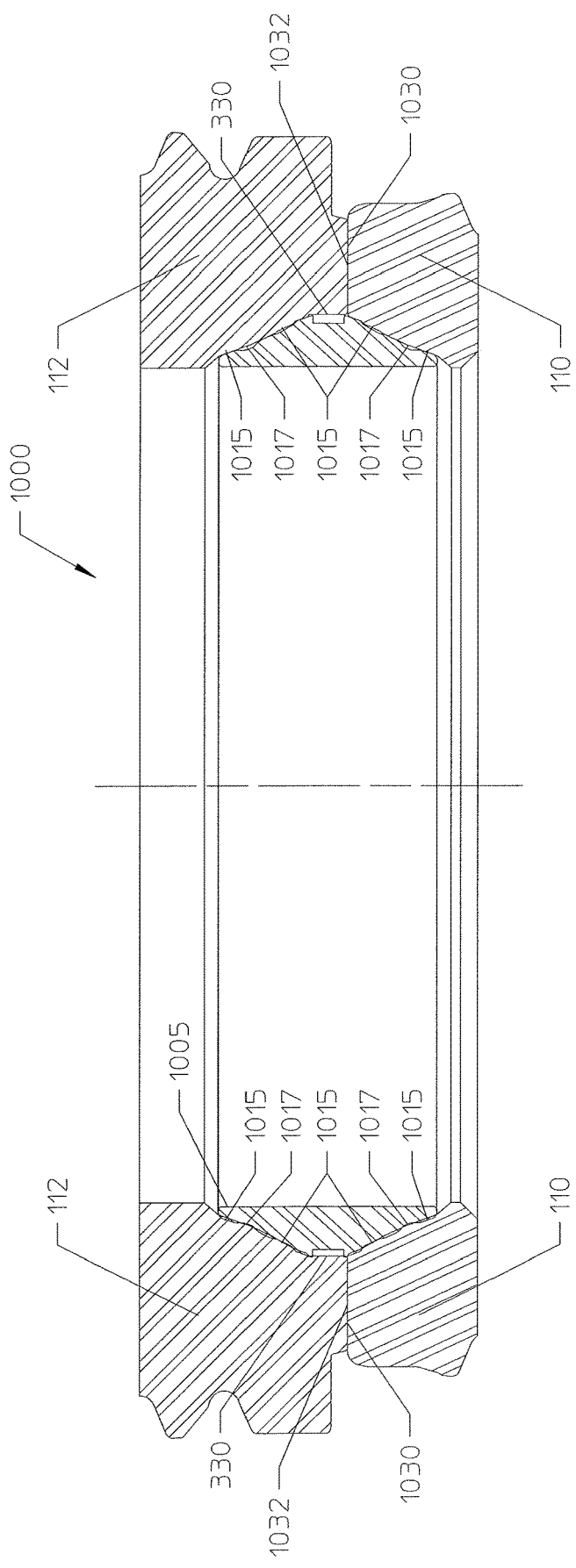
FIG. 7 is a side cross sectional view of a well assembly after a gasket has moved into alignment and tubular members contact one another, according to one or more aspects of the present disclosure.

FIGS. 6 and 7 illustrate aligning and sealing an interface of the housing 110 with the connector 112 using a representative gasket 1005 in accordance with aspects of the present disclosure. As shown in FIG. 7, the entire surface area of the shoulders 1030, 1032 making up the housing 110 and connector 112, respectively, are able to engage each other and thus bear much greater loading demands than existing connections.

In one or more embodiments, the tubular members (housing 110 and connector 112) may include multiple conical segments separated by one or more steps, or transitions, between conical segments and the gasket 1005 may similarly include multiple conical segments separated by one or more steps, or transitions. These steps may provide a visual indication to the operator for identifying the functionality of the given conical segment. Additionally, the steps may separate the conical segments by function, such that certain conical segments act as sealing surfaces while other conical segments act as aligning surfaces.

FIGS. 6 and 7 illustrate such an embodiment. The gasket 1005 may include a plurality of conical alignment segments 1015 and a plurality of conical sealing segments 1017 which may be separated by steps. The gasket 1005 is operable to increase surface area contact between the housing 110 and the connector 112 at the interface between these components and to create a seal at said interface. The alignment segments 1015 may enable alignment of the gasket 1005 when making initial contact with the tubular members 110, 112. The sealing segments 1017 of the gasket 1005 may only contact the conical segments of the tubular members 110, 112 after partially energizing the gasket 1005 (by mechanical, hydraulic, or any other similar means) and applying an axial load to both ends of the gasket 1005, as is done during latching of the connector 112 to the housing 110. The alignment segments 1015 of the gasket 1005 may be operable to prevent contact between the sealing segments 1017 of the gasket 1005 and the conical sealing segments of the tubular members 110, 112 during alignment, such that engagement of the sealing segments of the tubular members with the sealing segments 1017 of the gasket only occurs when the housing 110, connector 112, and gasket 1005 are axially aligned. In such an embodiment, the initial contact of the gasket 1005 with the housing 110 and the connector 112 occurs along the alignment segments 1015 of the gasket 1005. These alignment segments 1015 guide the gasket 1005 into place as the tubular members 110, 112 are brought together to create the assembly 1000.

By preventing oblique contact between the critical sealing segments 1017 of the gasket 1005 and the tubular members 110, 112, the sealing segments 1017 of the gasket 1005 may avoid wear until the assembly 1000 is ready to be sealed. The alignment segments 1015 may further minimize the sliding distance as the gasket 1005 is aligned. The gasket 1005 may further include a recess 330 that may be operable to receive a retention device (not shown).

FIG. 7 illustrates the assembly 1000 after the gasket 1005 has moved into alignment along alignment segments 1015 and the gasket 1005 has created a seal where the sealing segments 1017 contact the housing 110 and the connector 112. The shape of the gasket 1005 enables contact between the entire upward-facing shoulder 1030 of the housing and the entire downward-facing shoulder 1032 of the connector 112.

Figure 8A:
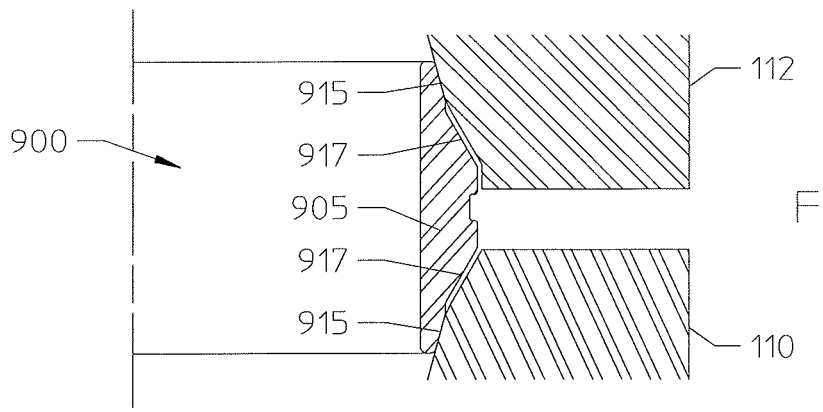
FIGS. 8A-C are side cross sectional views illustrating a progression of contact between a gasket and tubular members as the gasket moves into alignment and the tubular members contact one another.
Figure 8B:
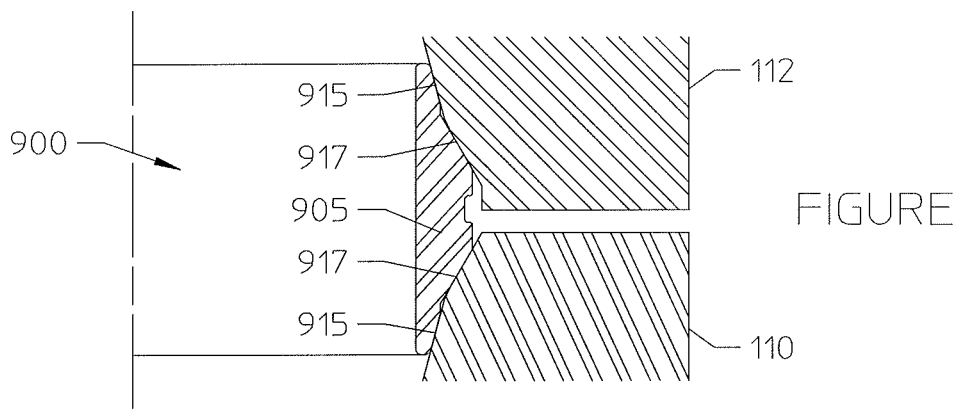
Figure 8C:
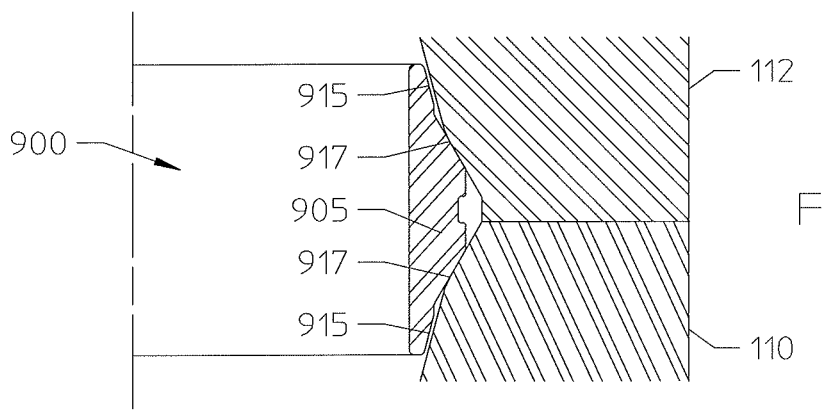

The steps of aligning, engaging, and sealing the housing 110 to the connector 112 are further shown in FIGS. 8A-C. As disclosed above, the net result is a housing-connector engagement that maximizes the load-bearing capabilities of the assembly 1000. The illustrated embodiment includes a gasket 905 that may feature mismatched angles on conical segments 915 and 917. The mismatched angles of the conical segments 915 and 917 may ensure that the sealing segments 917 do not sealingly engage the connector 112 and housing 110 until the gasket 905 is partially energized and precisely aligned within the tubular assembly. The angles of the alignment segments 915 may be less steep than the corresponding angles of the sealing segments 917 taken relative to the vertical axis. As a result, there will be less of a change of interference between the alignment segments 915 and the housing 110/connector 112 for a given axial stroke length of the connector 112 towards the housing 110. This mechanism may be used to allow initial contact to occur at the surfaces 915 of the gasket 905, but can result in a greater total interference on the sealing segments 917. Since interference is proportional to sealing contact stress, and therefor seal integrity, it is important to have greater interference on the sealing segments 917 than on the other segments 915. This prevents the sealing surface (i.e., sealing segments 917) of the gasket 905 from being the first surface to contact the housing/connector, which can result in scratching the sealing surface and, therefore, degraded performance of the seal.

In FIG. 8A, alignment segments 915 of the gasket 905, may come into contact with the housing 110 and the connector 112, while sealing segments 917 have not come into contact with the tubular members 110, 112, as described above. For example, if the gasket 905 is initially rotated relative to the tubular members, the alignment segments 915 of the gasket 905 may make first contact with the tubular members 110, 112 and facilitate corrective rotation to align the gasket 905. As the assembly 900 is brought into alignment, the sealing segments 917 of the gasket 905 may be brought into contact with the tubular members 110, 112 while the alignment segments 915 may remain in contact with tubular members 110, 112, as illustrated in FIG. 8B. The gasket 905 may create a seal where the gasket 905 contacts the tubular members 110, 112. The conical sealing segments 917 of the gasket 905 may be energized by drawing the tubular members 110, 112 together under high loads so as to radially and tangentially compress the gasket 905 to generate high contact stresses at the sealing segments 917. The high contact stresses provide a tight seal against high pressure fluid, such as oil or gas. In this embodiment, the alignment segments 915 may cease contact with tubular members 110, 112 while the sealing segments 917 remain in contact with the tubular members 110, 112. In other embodiments, alignment segments 915 may remain in contact during and after the seal is formed. In addition to sealing against fluid transported through the bore, the seal and connection provided by the gasket 905 may provide a load path for forces generated by bending and compressing the assembly. A gasket 905 comprising a slender ring may be flexible to withstand the load and compression of the bending moment applied by the connection between the tubular members 110, 112.

In one or more embodiments, the disclosed gasket (e.g., 105, 305, 405, 505, 605, 905, 1005) may include a thin corrosion resistant layer on the order of between 0.001" and 0.002" thick applied to the metal body of the gasket. The corrosion-resistant layer may be silver, tin, molybdenum di-sulfide, or a flouropolymer such as Xylan™. These materials provide adequate corrosion resistance and durability in high pressure and high temperature environments. They also provide reduced friction and protection against galling. The corrosion-resistant layer may be easier to apply to the entire gasket (e.g., 105, 305, 405, 505, 605, 905, 1005) during manufacture, but may also be applied subsequently.

The present disclosure may be useful for joining tubular members used in the hydrocarbon recovery industry, and is illustrated and explained in this context. It should be noted, however, that the invention can be applied more generally in other contexts and environments wherein first and second tubular members are to be sealingly joined, and possibly exposed to wide temperature and pressure ranges.

Having described the general use of a gasket with improved sealing capabilities and a tubular assembly that enables an increased surface area at the interfacing surfaces of tubular components, a gasket retention system that may be used with the tubular assembly will now be described.

Figure 9:
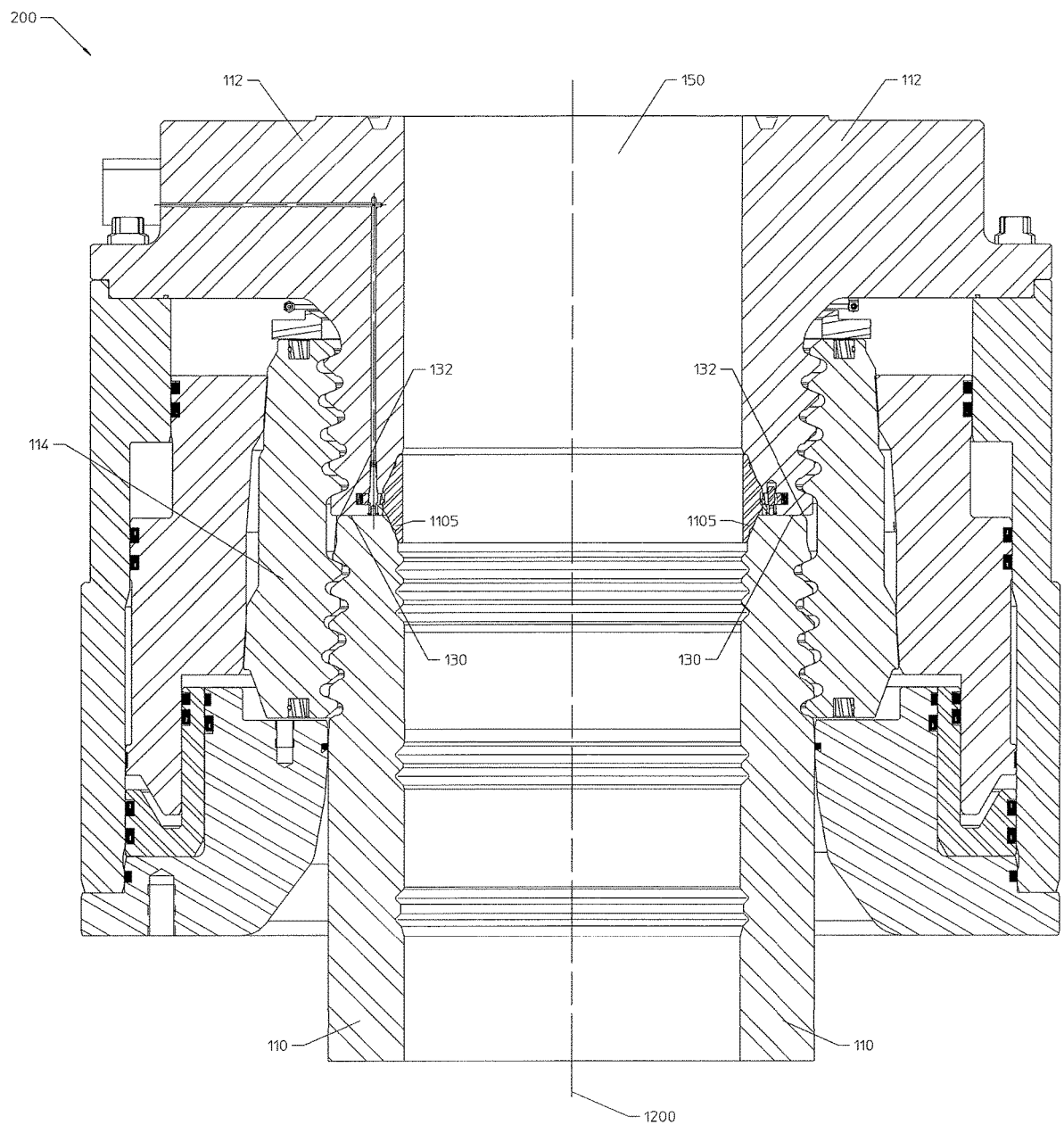
FIG. 9 is a side cross sectional view of a tubular assembly, according to one or more aspects of the present disclosure.

FIG. 9 illustrates an assembly 200 (e.g., wellhead assembly) including a tubular housing 110, a tubular connector 112, and a gasket 1105. A central bore 150 runs through each of the housing 110, the connector 112, and the gasket 1105. The tubular housing 110 and tubular connector 112 may include a subsea wellhead housing and a subsea wellhead connector, respectively. However, it should be noted that the disclosed gasket retention assembly may be similarly utilized in other contexts involving a tubular housing coupled to a tubular connector and sealed against the tubular connector via a gasket.

The assembly 200 having the housing 110 and the connector 112 is illustrated as being in a locked and sealed configuration. As illustrated, the housing 110 and connector 112 may be secured together via a locking ring 114. The locking ring 114 may surround the housing 110 and at least a main body of the connector 112. The gasket 1105 may include a conical upward facing surface and a conical downward facing surface. The gasket 1105 may generally create a seal when the conical upward facing surface of the gasket 1105 contacts a conical downward facing surface of the connector 112, and the conical downward facing surface of the gasket 1105 contacts a conical upward facing surface of the housing 110. The gasket 1105 may be self-aligning and relatively slender. The reduced size of the gasket 1105, compared to prior implementations that featured radially extending ribs, may enable contact between all (or almost all) of a downward facing shoulder 132 of the connector 112 and all (or almost all) of an upward facing shoulder 130 of the housing, as described at length above with reference to FIGS. 1-8.

The assembly 200 of FIG. 9 includes an improved gasket retention assembly 1100 that may be used to retain the gasket 1105 in a desired position relative to the connector 112. The gasket retention assembly 1100 may be self-energizing and enable hands free operation for selectively connecting or removing the gasket 1105 from the connector 112.

Figure 10:
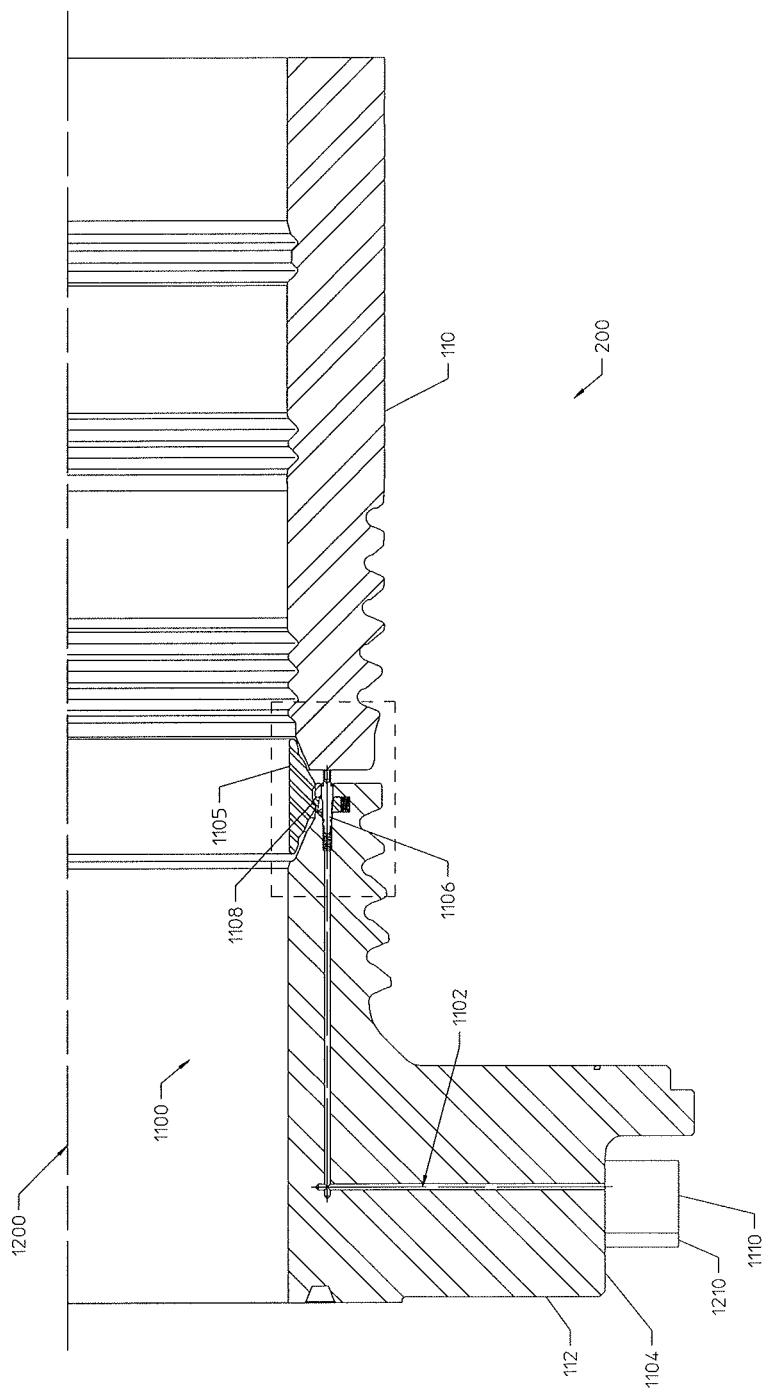
FIG. 10 is a side cross sectional view of a housing, connector, and associated gasket and gasket retaining assembly of the tubular assembly of FIG. 9, according to one or more aspects of the present disclosure.
Figure 11:
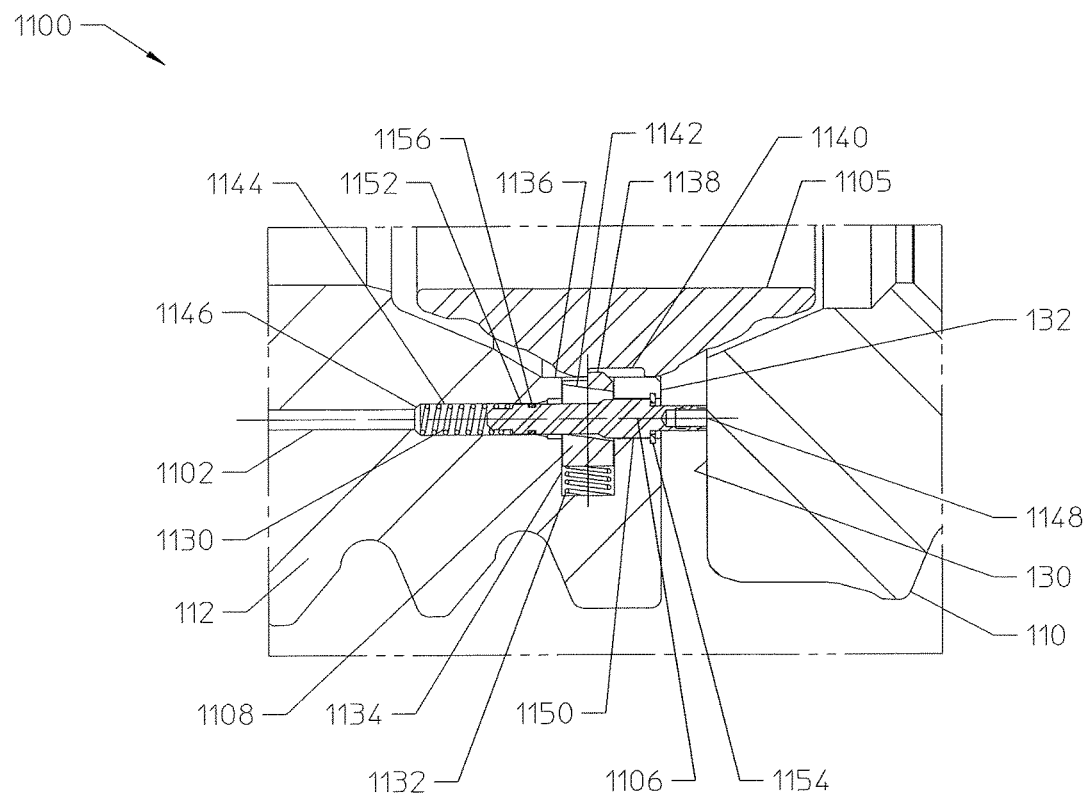
FIG. 11 is a close-up side cross sectional view of the gasket and gasket retaining assembly taken within the dashed lines of FIG. 10 in a landing configuration, according to one or more aspects of the present disclosure.
Figure 12:
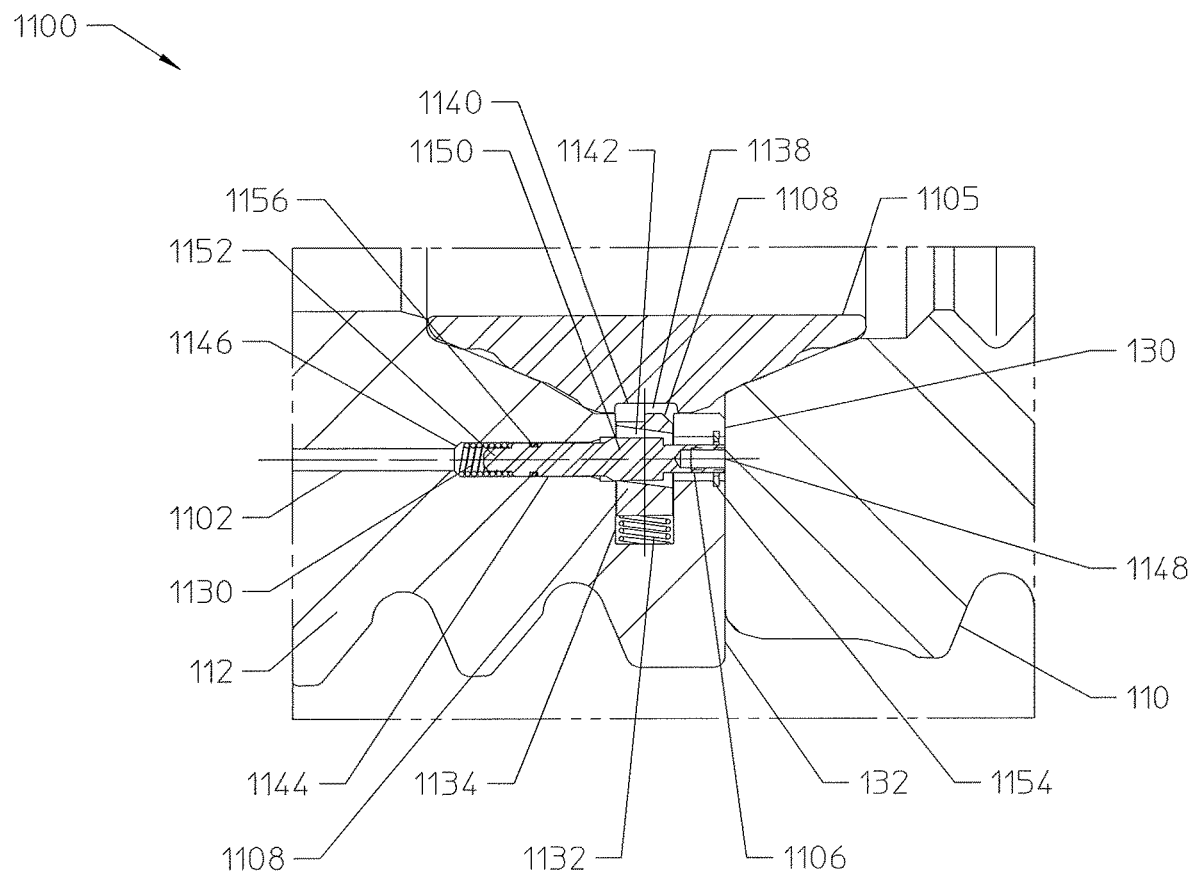
FIG. 12 is a close-up side cross sectional view of the gasket and gasket retaining assembly taken within the dashed lines of FIG. 10 in a landed configuration, according to one or more aspects of the present disclosure.

FIGS. 10-12 illustrate an embodiment of the disclosed gasket retention assembly 1100 that may be used to hold the gasket 1105 in a desired position within a larger tubular assembly 200. As shown in FIG. 10, the gasket retention assembly 1100 may include a port 1102 formed through the connector 112 and leading from an outer edge 1104 of the connector 112 at one end to a spring loaded plunger 1106 and a spring loaded retention mechanism 1108 at an opposite end. As shown, the gasket retention assembly 1100 may also include a closure mechanism 1110 disposed at the end of the port 1102 that terminates at the outer edge 1104 of the connector 112. The closure mechanism 1110 may include any type of device or assembly that may be used to selectively prevent a flow of fluid through the port 1102. For example, the closure mechanism 1110 may generally enable an end of the port 1102 to be selectively closed off or opened depending on a position or actuation of the closure mechanism 1110, thereby preventing or allowing fluid flow through the port 1102. The closure mechanism 1110 may include a valve fluidly coupled to the port 1102, a check valve positioned along the port 1102, or a separate plug that may be inserted into an end of the port 1102 to close the port 1102 (and/or removed from the port 1102 to open the port 1102).

The closure mechanism 1110 may be accessible to a remote operated vehicle (ROV) or other component located outside the tubular assembly 200. When the closure mechanism 1110 is positioned or actuated such that the port 1102 is open to fluid flow, (e.g., valve is open, no plug in the port, etc.), the closure mechanism 1110 may allow venting of fluid/pressure from the port 1102, or may allow pressure inputs from an external device (e.g., ROV) to flow into the port 1102. When the closure mechanism 1110 is positioned or actuated to prevent fluid flow through the port 1102 (e.g., valve is closed, plug is placed in the port), the closure mechanism 1110 may prevent fluid/pressure flow between the port 1102 and external components. In some instances, the closure mechanism 1110 may include a closed valve system with a fluid storage mechanism disposed therein, such that the port 1102 may be fluidically coupled to the fluid storage mechanism when the valve is open. An embodiment of such a closed valve system is described in detail below with reference to FIGS. 17-20.

The retention mechanism 1108 may directly engage with the gasket 1105 to effectively lock the gasket 1105 in position against the connector 112. The plunger 1106 may be used to selectively engage or disengage the retention mechanism 1108 from the gasket 1105 to enable retrieval of the gasket 1105 from the connector 112 as desired. In some instances, the closure mechanism 1110 may help to hydraulically control the position of the plunger 1106 to facilitate engagement or disengagement of the retention mechanism 1108 from the gasket 1105. Various different arrangements of the retention mechanism 1108, plunger 1106, and/or closure mechanism 1110 may be utilized to selectively engage and disengage the retention mechanism 1108 from the gasket 1105 throughout operation of the gasket retention assembly 1100. Different examples of functional arrangements of the gasket retention assembly 1100 will now be described in greater detail.

FIGS. 11 and 12 show a close up view of parts of the gasket retention assembly 1100 shown in FIG. 10. FIG. 11 shows the assembly 1100 in a landing position prior to the connector 112 landing on the housing 110 and being secured to the housing 110 (e.g., via a lock ring). FIG. 12 shows the assembly 1100 in a landed position after the connector 112 has successfully landed on the housing 110 such that the gasket 1105 is sealing the space between the connector 112 and the housing 110.

As illustrated, the gasket retention assembly 1100 includes the plunger 1106 with a corresponding spring 1130 and the retention mechanism 1108 with a corresponding spring 1132. The retention mechanism 1108 is disposed at least partially within a recess 1134 formed in the connector 112. The recess 1134 in the connector 112 is generally formed in a radial direction with respect to a longitudinal axis (e.g., 1200 of FIG. 9) of the bore (e.g., 150 of FIG. 9) through the tubular assembly (e.g., 200 of FIG. 9). As shown, the recess 1134 generally extends through an inner diameter 1136 of the connector 112. The retention mechanism 1108 and its corresponding spring 1132 are held within the recess 1134 formed in the connector 112. A portion of the plunger 1106 also passes through the recess 1134 as well.

The retention mechanism 1108 may include an engagement feature 1138 such as a shoulder, latch, or similar component, designed to engage with a complementary profile 1140 (e.g., recess, shoulder, latch, etc.) on a radially outer diameter of the gasket 1105. The engagement feature 1138 is disposed on an end of the retention mechanism 1108 extending in a radial direction from the recess 1134 toward the gasket 1105. At an opposite end, the retention mechanism 1108 is coupled to the spring 1132. The spring 1132 may abut an edge of the recess 1134 within the connector 112 such that the spring 1132 biases the retention mechanism 1108 in a radially inward direction toward the gasket 1105.

The retention mechanism 1108 includes a passage 1142 formed therethrough. The passage 1142 enables the spring loaded plunger 1106 to pass entirely through the retention mechanism 1108 and, consequently, through the recess 1134 in the connector 112. As illustrated, the plunger 1106 may generally extend in a direction that is parallel to the longitudinal axis (e.g., 1200 of FIG. 9) of the bore (e.g., 150 of FIG. 9) through the tubular assembly (e.g., 200 of FIG. 9). As such, the spring loaded plunger 1106 and the spring loaded retention mechanism 1108 are positioned perpendicular to each other, and they are positioned with respect to each other so that the plunger 1106 extends at least partially through the passage 1142 in the retention mechanism 1108. As illustrated, the passage 1142 may include sloped walls.

The plunger 1106 is disposed at least partially through another recess 1144 formed in the connector 112. The recess 1144 in the connector 112 is generally formed in a longitudinal direction that is parallel to the longitudinal axis (e.g., 1200 of FIG. 9) of the bore (e.g., 150 of FIG. 9) through the tubular assembly (e.g., 200 of FIG. 9). As shown, the recess 1144 generally extends through the downward facing shoulder 132 of the connector 112. The recess 1144 intersects the radially oriented recess 1134. The recess 1144 may form a portion of the port 1102 extending through the connector 112. The recess 1144 may have a slightly larger diameter than the rest of the port 1102, so as to provide a shoulder 1146 for holding the spring 1130 in place.

The plunger 1106 may include a contact end 1148 that extends from the downward facing shoulder 132 of the connector 112 in a longitudinal direction toward the upward facing shoulder 130 of the housing 110. The contact end 1148 may make first contact with the upward facing shoulder 130 of the housing 110 prior to the downward facing shoulder 132 of the connector 112 making contact with the upward facing shoulder 130 of the housing 110. At an opposite end of the plunger 1106 from the contact end 1148, the plunger 1106 is coupled to the spring 1130. The spring 1130 may abut the shoulder 1146 at the edge of the recess 1144 such that the spring 1130 biases the plunger 1106 in a longitudinally downward direction toward the upward facing shoulder 130 of the housing 110.

The plunger 1106 may include a midsection 1150 disposed adjacent the contact end 1148 along the length of the plunger 1106. The plunger 1106 may include a tail portion 1152 disposed adjacent the midsection 1150 along the length of the plunger 1106, such that the midsection 1150 is located between the contact end 1148 and the tail portion 1152. As illustrated, the midsection 1150 of the plunger 1106 may have a larger diameter than both the contact end 1148 and the tail portion 1152 of the plunger 1106. Part of the recess 1144 may be sized to accommodate the larger diameter of the midsection 1150, while other parts of the recess (e.g., at the spring or "tail" end) may be sized to accommodate only up to the diameter of the tail portion 1152 of the plunger 1106, and not the midsection 1150. The larger diameter portion of the recess 1144 may extend only from one or both sides of the other recess 1134.

A plunger retainer ring 1154 may be positioned within the recess 1144 at a position proximate the downward facing shoulder 132. The plunger retainer ring 1154 may help maintain the plunger 1106 within the recess 1144 during the landing process, as the midsection 1150 with the larger diameter is held in place by the retainer ring 1154.

One or more O-rings 1156 or other seal elements may be positioned about the plunger 1106 to seal an annular space between the plunger 1106 and the connector 112. The one or more O-rings 1156 generally provide a fluidic seal that keeps fluid and pressure that is present within the port 1102 from flowing beyond the plunger 1106. As illustrated, the one or more O-rings 1156 may be positioned about the tail portion 1152 of the plunger 1106.

In the landing position of FIG. 11, the gasket 1105 is locked to the connector 112 via the gasket retention assembly 1100. Specifically, the engagement feature 1138 (i.e., shoulder) of the retention mechanism 1108 is engaged with the corresponding profile 1140 on the gasket 1105 to hold the gasket 1105 against the connector 112. The spring 1132 keeps the retention mechanism 1108 biased outward to maintain the connection with the gasket 1105, and the spring 1130 biases the plunger 1106 toward the upward facing shoulder 130 of the housing 110 such that the contact end 1148 of the plunger 1106 extends outside of the connector 112. In arrangements where a valve or other closure mechanism 1110 is present, the valve may be held in an open position during landing of the connector 112 to allow fluid in the port 1102 to vent.

In the landed position of FIG. 12, the downward facing shoulder 132 of the connector 112 is brought into contact with the upward facing shoulder 130 of the housing 110. However, during the landing process, the contact end 1148 of the plunger 1106 may contact the upward facing shoulder 130 first. The upward facing shoulder 130 may transmit a reaction force in an upward direction to the contact end 1148 of the plunger 1106 as the connector 112 continues moving downward. The force from the upward facing shoulder 130 may press the plunger 1106 upward, compressing the spring 1130, until the entire plunger 1106 is positioned within the recess 1144 as shown in FIG. 12.

As the plunger 1106 is moved further into the connector 112, the radially large midsection 1150 of the plunger 1106 may move from a position proximate the plunger retainer ring 1154 to a position generally in line with the recess 1134. Due to the slanted walls of the passage 1142 formed through the retention mechanism 1108, a leading edge of the plunger midsection 1150 may contact the slanted wall on one side (e.g., radially outer side) of the passage 1142 as the plunger 1106 moves. The plunger 1106 may transmit a force in the longitudinal direction to the slanted wall of the passage 1142, and this force may push the retention mechanism 1108 in a radially outward direction since the retention mechanism 1108 is bound by the radially oriented recess 1134. Moving the plunger 1106 and, consequently, the retention mechanism 1108 in this way may withdraw the retention mechanism 1108 mostly or fully into the recess 1134 such that the retention mechanism 1108 is no longer in engagement with the gasket 1105. In the landed position of FIG. 12, the gasket 1105 is held between the slanted surfaces of the tubular housing 110 and connector 112. As shown, the gasket 1105 may no longer be held against the connector 112 via the gasket retention assembly 1100 when the gasket 1105 is in this landed position.

Turning back to FIG. 9, the cross section of the tubular assembly 200 shows the gasket retention assembly 1100 on one side of the connector 112 and not the other. It should be noted that the disclosed tubular assembly 200 may include multiple gasket retention assemblies 1100 (e.g., 2, 3, 4, 5, 6, 7, 8, or more) having respective ports, plungers, and retention mechanisms disposed within the connector 112. The multiple gasket retention assemblies 1100 may be located at different circumferential positions within the connector 112. The locations of the gasket retention assemblies 1100 may be spaced equidistant from each other circumferentially about the longitudinal axis 1200 of the bore 150.

In other embodiments, the tubular assembly 200 may feature just one gasket retention assembly 1100 having a port, plunger, and retention mechanism. In this case, as shown in FIG. 9, the tubular assembly 200 may include one or more additional retention features 1202 disposed within one or more recesses of the connector 112. For example, a retention feature 1202 may be disposed within the connector 112 on an opposite side from the gasket retention assembly 1100. However, similar retention features 1202 may be disposed at additional or alternative circumferential locations within the connector 112.

The retention feature(s) 1202 may include similar components as those used in the gasket retention assembly 1100, but without including a port or closure mechanism. Specifically, the retention feature(s) 1202 may each include a similar spring-loaded plunger and spring-loaded retention mechanism positioned within corresponding recesses formed in the connector. These components of the retention feature 1202 may be shaped, arranged, and designed to function as discussed in detail above with reference to the plunger 1106 and retention mechanism 1108 of FIGS. 10-12. In other instances, the retention feature(s) may include a pin mechanism, as shown. The retention feature(s) 1202 may press against the gasket 1105 from one or more different circumferential positions than the gasket retention assembly 1100 to help hold the gasket 1105 in place against the connector 112 during landing operations. Upon landing the connector 112, the retention feature(s), similar to the gasket retention assembly 1100, may be automatically deactivated via the interaction of the spring loaded plunger and retention mechanism to release the gasket 1105 from the connector 112.

The disclosed gasket retention assembly 1100 has a very small footprint within the overall tubular assembly 200. For example, the recess 1144 formed through the connector 112 is much smaller than recesses formed in existing connectors/housings to facilitate gasket retention. The recess 1144 that extends through the shoulder 132 of the connector 112 may be formed via drilled holes, instead of via large milled slots as is current practice. This reduced recess size means that a larger surface area of the downward facing shoulder 132 is able to contact the upward facing shoulder 130 of the housing 110 when the connector 112 is landed, thereby increasing the capacity of the housing/connector seal.

The disclosed gasket retention assembly 1100 also enables hands free or hydraulic operation for retrieving/releasing the gasket 1105 relative to the connector 112. For example, in the gasket retention assembly 1100 of FIGS. 10-12, no actions are required to land or retrieve the gasket 1105 with the connector 112. The closure mechanism 1110 may be positioned or actuated such that the port 1102 remains open to fluid flow during both landing and retrieval of the connector 112 so as to vent the fluid/pressure from the port 1102. As a result of this venting of the port 1102, the plunger 1106 is able to move up and down freely.

As described above, during landing, the housing 110 may push against the plunger 1106, which can move up since the port 1102 is vented. This movement of the plunger 1106 disengages the retention mechanism 1108 from the gasket 1105. Similarly, to retrieve the connector 112 and gasket 1105 together, the connector 112 may be unlocked from the housing 110 and picked up. As the connector 112 is lifted, the spring 1130 biases the plunger 1106 back to its original position extending from the edge of the connector 112. The plunger 1106 is able to move this direction due to venting of the port 1102. As the plunger 1106 moves back downward, the midsection 1150 of the plunger 1106 moves away from the passage 1142 such that the plunger 1106 is no longer pushing the retention mechanism 1108 toward the spring 1132. The spring 1132 biases the retention mechanism 1108 back toward the gasket 1105 such that the engagement feature 1138 of the retention mechanism 1108 re-engages the gasket 1105. As a result, the connector 112 may be reconnected to the gasket 1105 such that the gasket 1105 is retrieved with the connector 112 automatically during lifting of the connector 112. This retrieval of the gasket 1105 may be performed without the use of any ROV or hydraulic control operations.

At other times, it may be desirable to release the gasket 1105 from the connector 112. For example, it may be desirable to release the gasket 1105 from the connector 112 so that the gasket 1105 can be removed and replaced via an ROV. Releasing the gasket 1105 from the gasket retention assembly 1100 of FIGS. 10-12 involves first positioning or actuating the closure mechanism such that the port 1102 is closed to fluid flow therethrough, unlocking the connector 112 from the housing 110, and then picking up the connector 112 from the housing 110.

Positioning or actuating the closure mechanism 1110 to prevent fluid flow through the port 1102 traps the fluid above the plunger 1106 (e.g., forming a pressure trap), thereby causing the pressure within the port 1102 to remain constant. This prevents the plunger 1106 from moving back downward in response to the force from the spring 1130 while the connector 112 is being lifted. As a result, the plunger 1106 may stay in the same longitudinal position within the recess 1144 as the connector 112 is lifted. Similarly, the retention mechanism 1108 is held in the same position (i.e., disengaged from the gasket profile 1140) by the stationary plunger 1106.

After unlocking the connector 112 from the housing 110 (e.g., via the locking ring 114), the connector 112 may be lifted away from the housing 110 while the gasket retention device 1100 is in the closed configuration. With the closure mechanism 1110 closing off fluid flow through the port 1102, the retention mechanism 1108 may be unable to reconnect to the gasket profile 1140 during this movement of the connector 112. As a result, the gasket 1105 is no longer attached to the connector 112 and instead remains in its landed position against the housing 110. At this point, the gasket 1105 may be removed from the wellhead 110 via an ROV and traded out for another gasket 1105 via the same or a different ROV operating subsea. The connector 112 may then be landed back on the wellhead 110. To re-engage the gasket retention assembly 1100 with the new gasket 1105, the closure mechanism 1110 is opened again to allow fluid flow through the port 1102 and release the plunger 1106. That way, the next time the connector 112 is removed, the gasket retention assembly 1100 will be re-energized to engage the gasket profile 1140 and retrieve the gasket 1105.

The process of opening and closing the closure mechanism 1110 may be performed by an ROV that is controlled from the surface. The connector 112 may include an ROV interface 1210 as illustrated in FIG. 10, and the interface 1210 may provide one or more connections between an outside ROV stabbing into the interface 1210 and the closure mechanism (e.g., valve) 1110. The ROV may stab into the interface 1210 and output a control signal (e.g., hydraulic, electric, pneumatic) to the valve 1110 designed to actuate a valve or physically place a plug in the port 1102 to actuate the closure mechanism 1110 between the open and closed positions.

In addition, the interface 1210 may in some instances provide a direct fluid connection between an outside ROV stabbing into the interface 1210 and the port 1102. For example, an ROV may be able to stab into the interface 1210 and communicate pressurized fluid directly into the port 1102 when the closure mechanism 1110 is not actuated to close the port 1102. That way, the ROV may communicate pressurized fluid into the port 1102 to help push the plunger 1106 down. This may be particularly useful in the event that the plunger 1106 becomes stuck or the spring 1130 is ineffective at pushing the plunger 1106 back down while the connector 112 is lifted off the housing 110.

Figure 13:
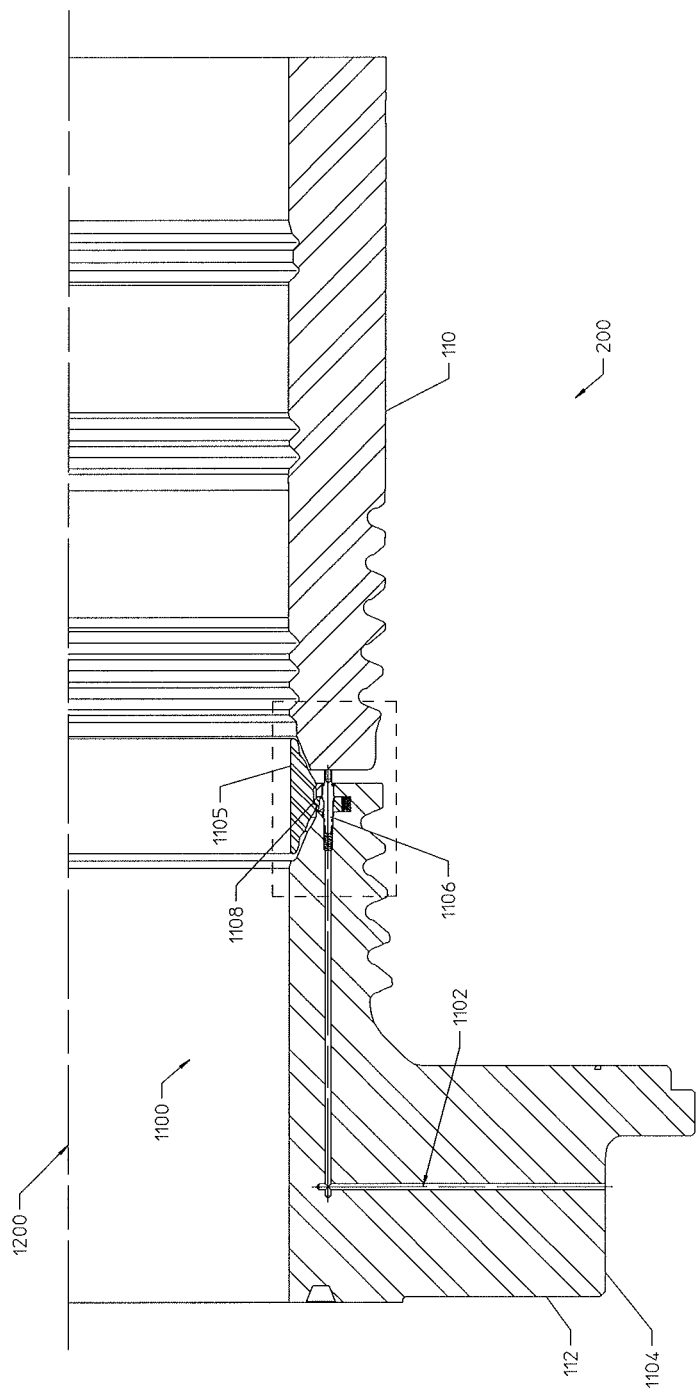
FIG. 13 is a side cross sectional view of a housing, connector, and associated gasket and gasket retaining assembly of a tubular assembly, according to one or more aspects of the present disclosure.

The gasket retention assembly 1100 of FIGS. 10-12 includes a closure mechanism 1110. However, other embodiments of the disclosed gasket retention assembly 1100 may not include any sort of valve, plug, or other closure mechanism on the connector 112. For example, FIG. 13 illustrates a similar gasket retention assembly 1100 where the pressure within the assembly is simply vented to the outside of the connector 112 via the port 1102. Venting pressure through the port 1102 may allow the plunger 1106 to move up and down freely, as described at length above. That way, the retention mechanism 1108 is always acting to retain the gasket 1105 within the connector 112 during movement of the connector 112. In some embodiments, the gasket retention mechanism 1100 may be designed in such a way as to allow the plunger 1106 and retention mechanism 1108 to release the gasket 1105 from the connector 112 in response to pressurized fluid communicated into the port 1102 (e.g., from an ROV).

Figure 14:
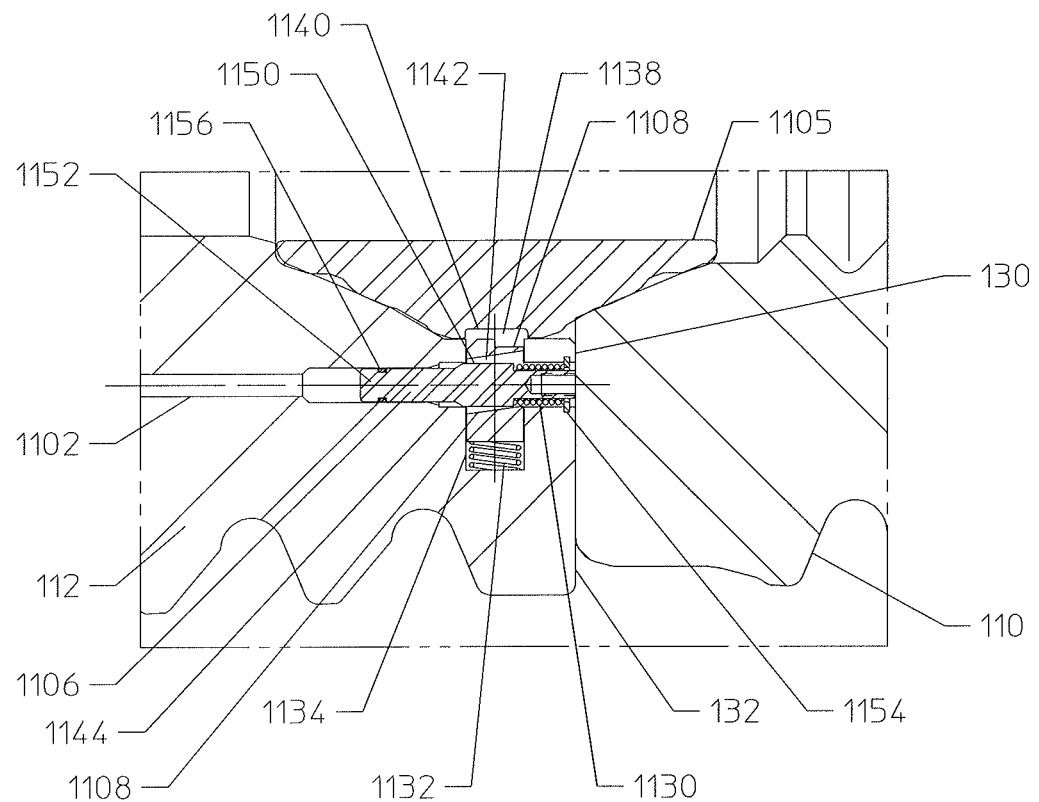
FIG. 14 is a close-up side cross sectional view of a gasket and gasket retaining assembly, according to one or more aspects of the present disclosure.

In another embodiment of the tubular assembly 200, the gasket retention mechanism 1100 may be designed with a reverse arrangement of the plunger 1106 and retention mechanism 1108 from the arrangement described above with reference to FIGS. 11 and 12. FIG. 14 illustrates a close up version of one such gasket retention mechanism 1100. All the elements of the gasket retention assembly 1100 may be the same as those shown and described with reference to FIGS. 11 and 12, except for the plunger 1106, spring 1130, and retention mechanism 1108. In this case, the spring 1130 may be located at the downward longitudinal end of the recess 1144 (e.g., positioned against the retainer ring 1154), such that the plunger 1106 is located within the recess 1144 at a position above the spring 1130. In the retention mechanism 1108 of FIG. 14, the slanted walls of the passage 1142 may be slanted in a different direction than those of the previously described example. Specifically, instead of the walls of the passage 1142 slanting in a generally upward and radially inward direction (as shown in FIGS. 11 and 12), the walls of the passage 1142 in FIG. 14 may slant in a generally upward and radially outward direction.

As a result of the different shape of the retention mechanism 1108 in FIG. 14, the gasket retention assembly 1100 may operate differently from the assembly described above with reference to FIGS. 11 and 12. In the gasket retention assembly 1100 of FIG. 14, the spring 1130 may bias the plunger in an upward direction within the recess 1144 such that the midsection 1150 of the plunger 1106 is only partially located within the recess 1134 and contacting the upper end of the slanted wall of the passage 1142. This is the default position that the gasket retention assembly 1100 may take during landing of the connector 112 and gasket 1105 onto the housing 110. In this position, the retention mechanism 1108 engages directly with the gasket profile 1140 to maintain the gasket 1105 in position against the connector 112.

In the system of FIG. 14, the connector 112 may be landed onto the housing 110 without the gasket retention assembly 1100 automatically releasing the gasket 1105. This is because there is no contact end of the plunger 1106 protruding from the connector 112 toward the housing 110. When it is desired to release the gasket 1105 from the connector 112, the gasket retention assembly 1100 may be disengaged via an ROV stabbing into the interface 1210 of FIG. 10 and providing a pressurized fluid input to the port 1102. This may increase the pressure in the port 1102 to a point that the pressure forces the plunger 1106 in a downward direction against the spring force from the spring 1130.

As the plunger 1106 is moved further downward, the radially large midsection 1150 of the plunger 1106 may move from a relatively upper position in the recess 1144 to a position generally in line with the intersecting recess 1134. Due to the slanted walls of the passage 1142 formed through the retention mechanism 1108, a leading edge of the plunger midsection 1150 may contact the slanted wall on one side (e.g., radially outer side) of the passage 1142 as the plunger 1106 moves. The plunger 1106 may transmit a force to the slanted wall of the passage 1142, which in turn pushes the retention mechanism 1108 in a radially outward direction against the spring 1132. Moving the plunger 1106 and, consequently, the retention mechanism 1108 in this way may withdraw the retention mechanism 1108 into the recess 1134 such that the retention mechanism 1108 is no longer in engagement with the gasket 1105.

The gasket 1105 may no longer be held against the connector 112 via the gasket retention assembly 1100 when an ROV or other fluid control mechanism is inputting pressure to the port 1102. The closure mechanism (e.g., 1110 of FIG. 10) may then be actuated closed after the pressure is input to the port 1102 in order to maintain the gasket 1105 in the released position while the connector 112 is removed from the gasket 1105 and housing 110. This allows an ROV to remove the gasket 1105 from the tubular assembly and replace it with a new gasket 1105. In embodiments where a closure mechanism 1110 is not present on the connector 112, however, the ROV may simply remain connected to the interface and maintain the pressure within the port 1102 as the connector 112 is lifted off the housing 110 and away from the disengaged gasket 1105.

Once the gasket 1105 has been replaced, the ROV may interface with the connector 112 again to remove or actuate the closure mechanism 1110 (if there is one) to an open position, or may simply disengage from the interface 1210 (if there is not a valve), thereby allowing the port 1102 to vent the pressurized fluid and enable the plunger 1106 to move back up. This movement of the plunger 1106 allows the retention mechanism 1108 to return to its engaged position holding the gasket 1105 in place against the connector 112. To retrieve the gasket 1105 with the connector 112, no action is needed since the gasket retention assembly 1100 is spring loaded into engagement with the gasket 1105.

Figure 15:
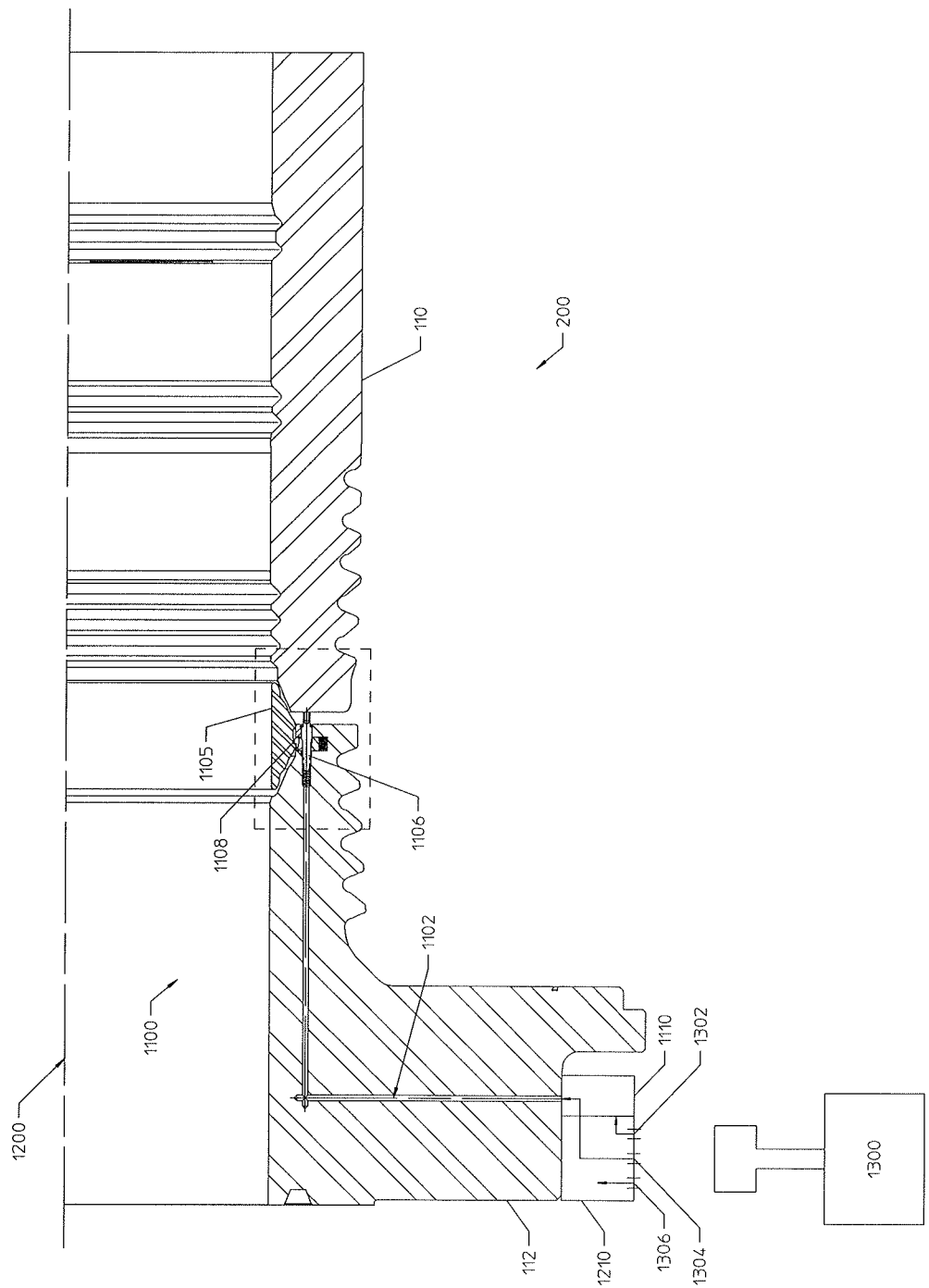
FIG. 15 is a partial side cross sectional view of a tubular assembly having a gasket retaining assembly and multiple stab inputs for a remote operated vehicle (ROV), according to one or more aspects of the present disclosure.

FIG. 15 illustrates an embodiment of the tubular assembly 200 where the connector 112 includes an ROV interface 1210 that allows an ROV 1300 to stab into the connector 112 and perform multiple functions within the tubular assembly 200. The interface 1210 may include multiple hydraulic, electric, pneumatic, or other inputs 1302, 1304, and 1306 that each communicate control or fluid signals to the tubular assembly 200. For example, the input 1302 may communicate hydraulic, electric, pneumatic, or other control signals from the ROV 1300 for controlling operation of a closure mechanism 1110 in the gasket retention assembly 1100, as described above. The input 1304 may communicate hydraulic fluid from the ROV 1300 directly into the port 1102 of the gasket retention assembly 1100, as described above. The input 1306 may communicate hydraulic, electric, pneumatic, or other types of control signals from the ROV 1300 to the tubular assembly 200 for testing the gasket 1105. Other additional or different inputs may be utilized on the ROV interface 1210. The interface 1210 may include one or more wet-connect interfaces that sealingly connect the ROV 1300 to the one or more inputs on the connector 112. This arrangement of the interface 1210 may allow the ROV 1300 to simply stab into the connector 112 once and perform multiple different operations on the tubular assembly 200, such as testing the gasket 1105 and then releasing the gasket 1105.

Figure 16:
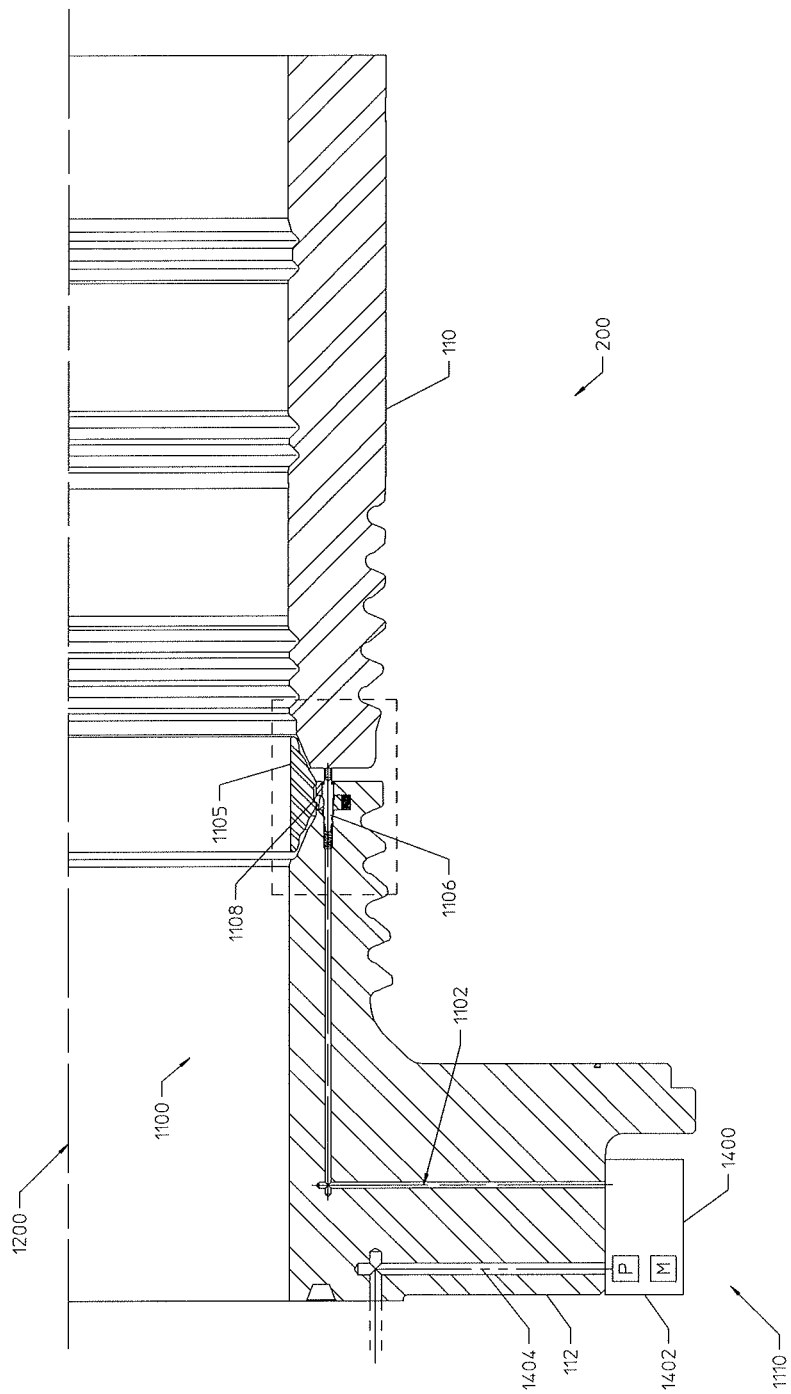
FIG. 16 is a partial side cross sectional view of a tubular assembly having a gasket retaining assembly that is controlled via a control line from the surface, according to one or more aspects of the present disclosure.

Although the functions of the tubular assembly 200 and, more specifically, the disclosed gasket retention assembly 1100 have been described above as being controlled by inputs from an ROV, other embodiments of the tubular assembly 200 may utilize other methods for controlling the gasket retention assembly 1100. As shown in FIG. 16, for example, the closure mechanism 1110 on the connector 112 may include a solenoid valve 1400 coupled to a control system 1402. The control system 1402 may receive electrical control signals from the surface via a control line 1404 extending upward from the connector 112. Upon receiving a signal to open or close the port 1102, the control system 1402 may output an electrical signal to actuate the solenoid valve 1400 accordingly.

Figure 17:
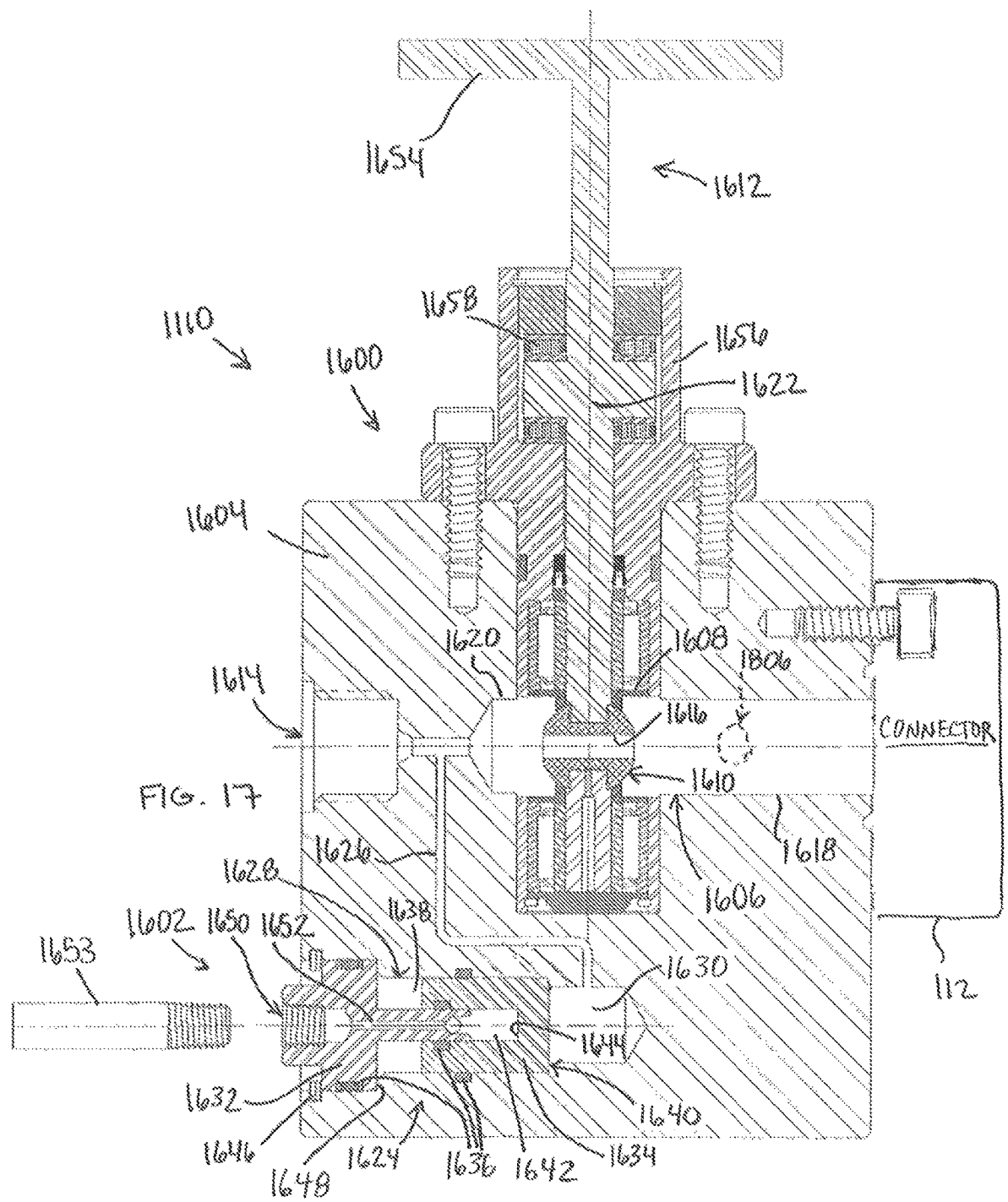
FIG. 17 is a cross sectional view of a ball valve assembly for use as a closure mechanism in a gasket retaining assembly, according to one or more aspects of the present disclosure.
Figure 18:
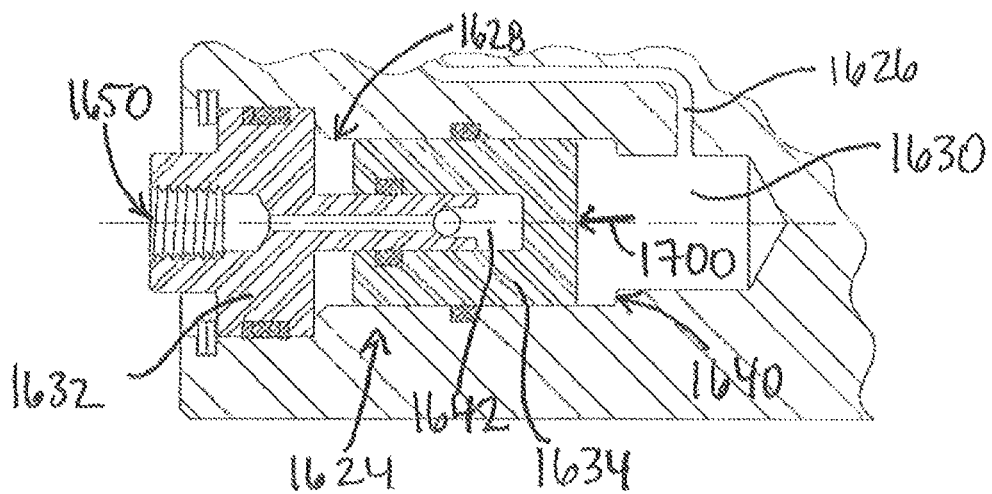
FIG. 18 is a cross sectional view of an accumulator in the ball valve assembly of FIG. 17, according to one or more aspects of the present disclosure.

As mentioned above, the closure mechanism 1110 may include a closed valve system with a fluid storage mechanism disposed therein. FIGS. 17-20 provide a detailed example of one such closure mechanism 1110, which is a valve assembly 1600 with a fluid storage mechanism 1602. As shown in FIG. 17, the valve assembly 1600 is a ball valve assembly. The ball valve assembly 1600 may include a housing 1604, a first fluid passage 1606 (among various other fluid lines), a seat 1608, a ball 1610, a valve actuator 1612, the fluid storage mechanism 1602, and an ROV stab interface 1614. It should be noted that additional or other components than those illustrated may be present in the ball valve assembly 1600 as well.

As illustrated, the housing 1604 includes the first fluid passage 1606 formed therethrough. The seat 1608 is disposed within the first fluid passage 1606, and the ball 1610 is located in the seat 1608. The ball 1610 features a bore 1616 formed therethrough. The ball 1610 is positioned in the seat 1608 and rotatably movable between an open position and a closed position. The seat 1608 provides sealing surfaces for sealing between an outer surface of the ball 1610 and corresponding portions of the fluid passage(s) formed through the housing 1604.

The ball 1610 is shown in the open position in FIG. 17. In the open position, the ball 1610 is oriented such that the bore 1616 of the ball 1610 is aligned with the first fluid passage 1606. When the ball 1610 is actuated to the closed position, the ball 1610 may be rotated via the valve actuator 1612 about an axis 1622 such that the bore 1616 of the ball 1610 is not aligned with the first fluid passage 1606. For example, in the closed position, an axis of the bore 1616 of the ball 1610 may be oriented perpendicular to an axis of the first fluid passage 1606.

In FIG. 17 (which shows just one cross section of the ball valve assembly 1600), the first fluid passage 1606 appears to be the only fluid passage of the housing 1604 in which the ball 1610 and seat 1608 are located. In some embodiments, the housing 1604 may include only a single such fluid passage 1606 within which the ball 1610 and seat 1608 are located. In other embodiments, the housing 1604 may include at least one additional fluid passage that intersects the first fluid passage 1606 at the point where the ball 1610 and seat 1608 are located. That way, as the ball 1610 is rotated in the seat 1608, the ball may be switched between the open position where the ball 1610 opens the first fluid passage 1606 and a closed position where the ball 1610 closes the first fluid passage 1606 and opens another fluid passage.

Figure 19:
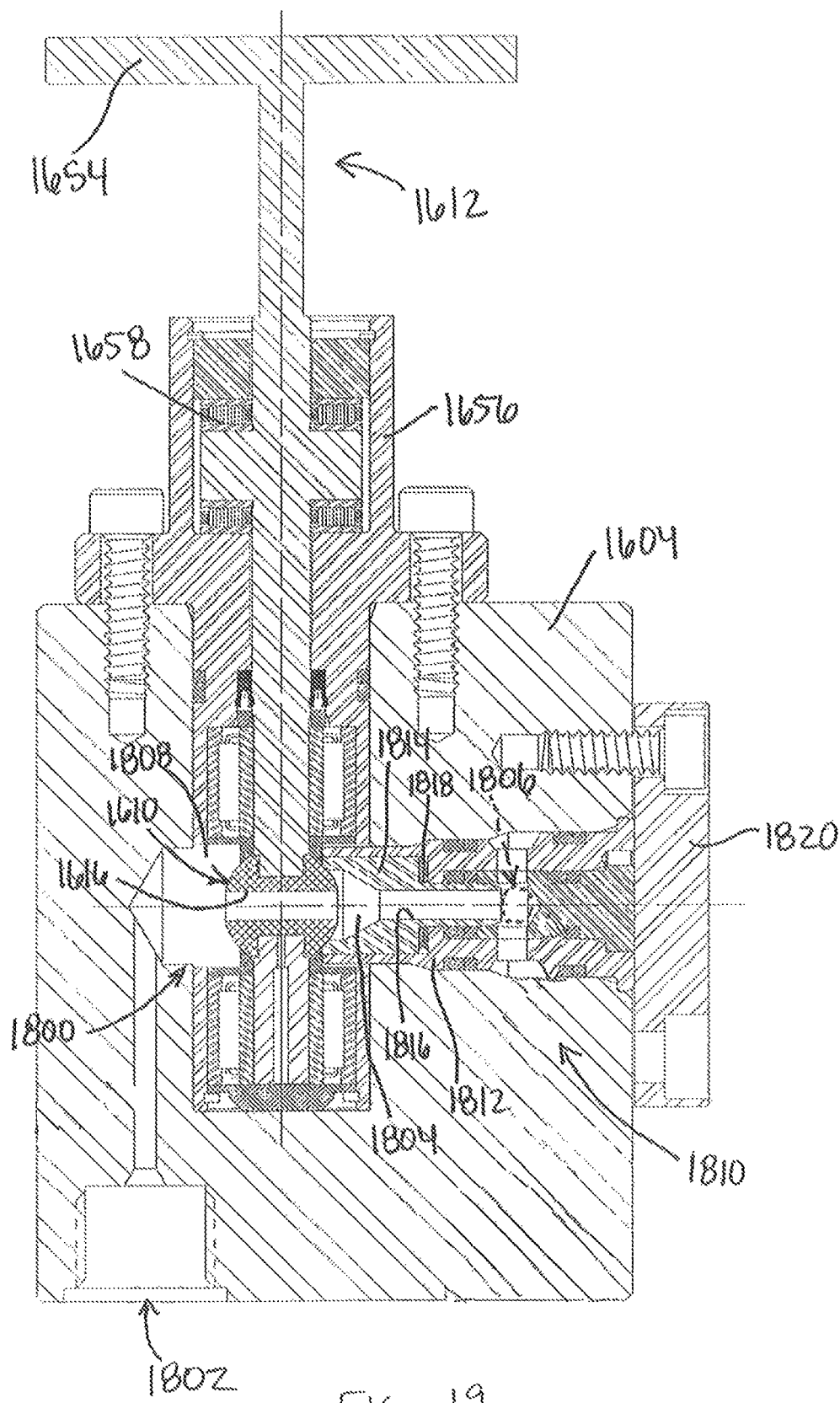
FIG. 19 is a cross sectional view of the ball valve assembly of FIG. 17 taken across a 90° offset cross section, according to one or more aspects of the present disclosure.

FIG. 19 represents an optional cross sectional view of the ball valve assembly 1600 taken perpendicular to the cross sectional view of FIG. 17, showing that the ball 1610 and seat 1608 may also be located within a second fluid passage 1800 of the housing 1604. The ball 1610 is shown in the closed position in FIG. 19. As illustrated, in the "closed position" the ball 1610 may be oriented such that the bore 1616 of the ball 1610 is aligned with the second fluid passage 1800. When the ball 1610 is in the closed position as shown, an axis of the bore 1616 of the ball 1610 may be oriented perpendicular to the axis of the first fluid passage (1606 of FIG. 17).

It should be noted that even more additional fluid passages may be formed through the housing 1604 for switching flow therethrough via the rotatable ball 1610. For example, the housing 1604 may include three, four, or more fluid passages that intersect at the position of the seat 1608 and the ball 1610 held in the seat 1608. The actuator 1612 may be used to actuate the ball 1610 between various orientations in which the bore 1616 of the ball 1610 is aligned with the different fluid passages through the housing 1604.

Turning back to FIG. 17, the first fluid passage 1606 may form a fluid pathway between the communication port 1102 formed through the connector 112 and the fluid storage mechanism 1602 of the ball valve assembly 1600. A first portion 1618 of the first fluid passage 1606 on a first side of the ball 1610 may be fluidly coupled to the communication port 1102 in the connector 112, while a second portion 1620 of the first fluid passage 1606 on a second side of the ball 1610 opposite the first side may be fluidly coupled to the fluid storage mechanism 1602. As illustrated, the entire ball valve assembly 1600 may be coupled to a surface of the connector 112 such that the first fluid passage 1610 of the housing 1604 is aligned with the communication port 1102 at the location where the port 1102 reaches the outer surface of the connector 112. The ball valve assembly 1600 may be bolted, or otherwise fastened, to the connector 112 via any desirable fastening mechanism.

When the ball 1610 is in the open position, as shown in FIG. 17, the ball 1610 allows fluid flow through the first fluid passage 1606. This is because in the open position, opposing ends of the bore 1616 through the ball 1610 are open to the first and second portions 1618 and 1620, respectively, of the first fluid passage 1606. When the ball 1610 is in the closed position, the ball 1610 prevents fluid flow through the first fluid passage 1606. This is because in the closed position, opposing ends of the bore 1616 through the ball 1610 are out of alignment with (and therefore closed to) the first and second portions 1618 and 1620, respectively, of the first fluid passage 1606.

The fluid storage mechanism 1602 in the ball valve assembly 1600 is fluidly coupled to one end of the main fluid passage 1606. The fluid storage mechanism 1602 is used to capture pressure output through the communication bore 1102 of the connector 112 while the ball valve is open so that, upon closure of the ball valve, pressure is trapped within the communication bore 1102.

As illustrated, the fluid storage mechanism 1602 may include an accumulator 1624 disposed in the housing 1604. The accumulator 1624 may be a nitrogen accumulator. However, it should be noted that other types of accumulators that hold other fluids may be utilized in other embodiments. The accumulator 1624 is fluidly coupled to the second portion 1620 of the first fluid passage 1606 (e.g., via a fluid line 1626).

A more detailed description of an example accumulator 1624 will now be provided. However, it should be noted that other possible configurations and arrangements of components in a fluid storage mechanism 1602 may be utilized in the ball valve assembly 1600. As illustrated, the accumulator 1624 may include a fluid chamber 1628 with a first end 1630 open to the fluid line 1626 leading toward the ball 1610, a rod component 1632 and a piston component 1634 both disposed in the fluid chamber 1628, and a plurality of seals 1636.

The fluid chamber 1628 may be drilled into the housing 1604 from an external wall of the housing 1604. The fluid chamber 1628 may include the first end 1630 and an intermediate portion 1638. The intermediate portion 1638 of the fluid chamber 1628 may have a larger diameter than the first end 1630, and the housing 1604 features a shoulder 1640 that defines the change in diameter between the first end 1630 and the intermediate portion 1638 of the chamber 1628. The piston component 1634 is disposed in the intermediate portion 1638 of the fluid chamber 1628 and is allowed to move axially within the fluid chamber 1628 in response to pressure changes communicated to the accumulator 1624 from the first fluid passage 1606.

The piston component 1634 may be a partially hollow, cylindrical component with a first end facing the first end 1630 of the fluid chamber 1628 and a second end facing toward the rod component 1632. The first end of the piston component 1634 fills the entire cross sectional area of the intermediate portion 1638 of the fluid chamber 1628. The second end of the piston component 1634 has an opening therein that extends longitudinally through a portion of the piston component 1634.

The rod component 1632 generally includes a rod that extends axially through the opening in the second end of the piston component 1634. An internal chamber 1642 is defined between the end of the rod component 1632 and an interior wall 1644 of the piston component 1634, as shown. The rod is sized such that the piston component 1634 is able to move axially relative to the rod component 1632 in response to a change of pressure acting on the first end of the piston 1634. Such movement of the piston component 1634 relative to the rod component 1632 may change the volume of the internal chamber 1642, which holds the accumulator fluid (e.g., nitrogen). One or more seals 1636 are disposed at the interface between an outer surface of the piston component 1634 and an inner wall of the intermediate section 1638 of the fluid chamber 1628. One or more seals 1636 are also disposed at the interface between an outer diameter of the rod component 1632 and an inner diameter of the annular end of the piston component 1634.

In the illustrated embodiment, the rod component 1632 may further include a section with an increased diameter that is held in place against the housing 1604 (e.g., via washers 1646 and a shoulder 1648 of the housing 1604). One or more seals 1636 are disposed at the interface between a radially external surface of this larger diameter portion of the rod component 1632 and a radially internal surface of the fluid chamber 1628. Although the larger diameter portion and the rod portion of the rod component 1632 are illustrated as being a single integral piece of material, other embodiments of the accumulator 1624 may feature the rod portion as being a separate piece coupled directly to the larger diameter portion to form the rod component 1632.

As illustrated, the rod component 1628 may have a port 1650 drilled or otherwise formed into an end of the rod component 1628 extending from the housing 1604. The port 1650 may be fluidly coupled to the internal chamber 1642 via a flow line 1652 extending longitudinally through the rod portion of the rod component 1632 during initial setup of the ball valve assembly 1600. This allows an external fill line 1653 to be received into the port 1650 and used to fill the internal chamber 1642 with the accumulator fluid. After filling the internal chamber 1642, a plug (not shown) may be inserted into the port 1650 to maintain the fluid within the internal chamber 1642.

In operation, the accumulator 1624 stores fluid pressure in response to increased pressure in the communication port 1102 of the connector 112. This pressure increase may be caused by the plunger (1106 of FIG. 10) of the gasket retention assembly (1100 of FIG. 10) being axially moved further into the communication port 1102 in response to the connector 112 landing on the corresponding tubular housing (110 of FIG. 10). When the ball 1610 is in the open position, the increased fluid pressure from the communication port 1102 increases the pressure in the first fluid passage 1606, the fluid line 1626, and the first end 1630 of the accumulator 1624. The increased pressure acts on the first end of the piston component 1634, thereby pushing the piston component 1634 in the direction of the rod component 1632 (arrow 1700 in FIG. 18). This compresses the internal fluid chamber 1642 to absorb the pressure increase via the accumulator 1624. Thus, the accumulator 1624 absorbs the excess pressure from setting down the connector 112 on the tubular housing.

As described at length above, this movement of the plunger (1106 of FIG. 10) into the communication port 1102 of the connector 112 acts to disconnect the gasket (1105 of FIG. 10) from the connector 112. When it is desired to remove the connector 112 from the gasket (1105 of FIG. 10), the ball valve assembly 1600 may be closed such that fluid flow through the first fluid passage 1606 is blocked. At this point, the accumulator 1624 is still storing the increased fluid pressure. However, since the accumulator 1624 is blocked from the communication port 1102 via the closed ball 1610, the pressure is unable to equalize between the two when the connector 112 is lifted off the tubular housing (110 of FIG. 10). The fluid pressure is trapped in the communication port 1102 via the closed ball 1610, thus preventing the plunger (1106 of FIG. 10) from being returned to its original position within the gasket retention assembly (1100 of FIG. 10).

When it is desired to reconnect the connector 112 to the gasket (1105 of FIG. 10), the ball valve assembly 1600 may be reopened such that fluid flow is allowed through the first fluid passage 1606. At this point, the accumulator 1624 is fluidly coupled to the communication port 1102 via the open ball 1610, and pressure is able to equalize through the entire system when the connector 112 is again lifted off the tubular housing (110 of FIG. 10). The excess fluid pressure is communicated back out from the accumulator 1624 through the communication port 1102 and into contact with a surface of the plunger (1106 of FIG. 10) so as to force the plunger back to its original position extending partially from the communication port 1102. As such, the gasket retention assembly (1100 of FIG. 10) is able to retain the gasket (1105 of FIG. 10) with the connector 112 upon removing the connector 112 to the surface.

As mentioned above, other types and arrangements of the accumulator 1624 may be utilized in other embodiments. For example, the piston component may have a rod shape that is received into a cylinder shaped component at an end of the housing 1604, instead of the other way around. The orientation of the accumulator 1624 built into the housing 1604 may be different in other embodiments. For example, the accumulator 1624 may extend inward from any side, top, or bottom portion of the housing 1604.

The valve actuator 1612 of the ball valve assembly 1600 may include a lever 1654 extending outward from the housing 1604 of the ball valve assembly 1600, the lever 1654 being coupled to the ball 1610 for rotating the ball 1610. Rotation of the lever 1654 may directly cause rotation of the ball 1610. The lever 1654 extending from the housing 1604 may be designed for engagement with an ROV such that the ROV is able to rotate the lever 1654 when opening or closing the ball valve assembly 1600 is desired. The valve actuator 1612 may also include a body 1656 received into the housing 1604 and supporting the lever 1654 via a series of bearings 1658. It will be recognized that other particular types or arrangements of the valve actuator 1612 may be used in other embodiments.

The ball valve assembly 1600 may include at least one ROV stab interface 1614. The ROV stab interface 1614 may be designed with one or more connectors and/or seals to receive a stab input from an ROV that allows the ROV to apply pressure to a flow line within the ball valve assembly 1600. The ROV stab interface of FIG. 17, for example, is fluidly coupled to the second portion 1620 of the first fluid passage 1606. That way, if the gasket retention assembly (1100 of FIG. 10) fails to return the plunger to its initial position via spring force and the pressure flowing through the communication port 1102, an ROV may stab into the ROV stab interface 1614 of the open ball valve assembly 1600 and apply increased pressure to the communication port 1102 to reset the plunger.

As mentioned above, in some embodiments, the ball valve assembly 1600 may include one or more additional fluid passages through which the ball 1610 selectively allows/prevents fluid flow. FIG. 19 illustrates a cross-sectional view of the ball valve assembly 1600 of FIG. 17 taken at an angle of 90 degrees (about axis 1622) from the cross-sectional view of FIG. 17. This image shows the ball valve assembly 1600 when the ball 1610 is in the closed position. Although the ball 1610 in the closed position prevents flow through the first passage (1606 of FIG. 17), the ball 1610 in the closed position allows flow through the second fluid passage 1800 formed through the housing 1604 as shown in FIG. 19.

The ball valve assembly 1600 may include an ROV stab interface 1802 that is fluidly coupled to the second fluid passage 1800. The second fluid passage 1800 may form a fluid pathway between the communication port 1102 formed through the connector 112 and the ROV stab interface 1802 when the ball 1610 is in the closed position. A first portion 1804 of the second fluid passage 1800 on a first side of the ball 1610 may be fluidly coupled to the first portion 1618 of the first fluid passage 1606 (of FIG. 17) via a flow line 1806 formed through the housing 1604. In this way, the first portion 1804 of the second fluid passage 1800 may be fluidly coupled to the communication port 1102 in the connector 112 (shown in FIG. 17), while a second portion 1808 of the second fluid passage 1800 on a second side of the ball 1610 opposite the first side may be fluidly coupled to the ROV stab interface 1802.

The ROV stab interface 1802 may be designed with one or more connectors and/or seals to receive a stab input from an ROV that allows the ROV to apply pressure to a flow line within the ball valve assembly 1600. The ROV stab interface 1802 of FIG. 19, for example, is fluidly coupled to the second portion 1808 of the second fluid passage 1800. That way, if it is desirable to return the plunger to its initial position while the ball 1610 remains in the closed position, an ROV may stab into the ROB stab interface 1802 of the closed ball valve assembly 1600 and apply increased pressure to the communication port 1102 to reset the plunger.

As illustrated in FIG. 19, the ball valve assembly 1600 may be equipped with a ball rotation assembly 1810 that facilitates a smooth transition of the ball 1610 between the open and closed positions in response to rotation by the valve actuator 1612. The ball rotation assembly 1810 may be positioned in a portion of the second fluid passage 1800, as illustrated. Specifically, the ball rotation assembly 1810 may be located in the first portion 1804 of the second fluid passage 1800 of the ball valve assembly 1600. However, in other embodiment, the ball rotation assembly 1810 may instead be positioned in the first fluid passage 1606 of the ball valve assembly 1600.

The ball rotation assembly 1810 may include a body 1812, a piston 1814 with a bore 1816 formed therethrough, and a biasing mechanism 1818. In FIG. 19, the biasing mechanism 1818 includes Belville washers. In the ball rotation assembly 1810, the body 1812 may be secured with respect to the housing 1604. For example, the body 1812 may include a flange portion that is received in a counterbore of the housing 1604 and held in place there by a cover 1820 bolted to the outside of the housing 1604. One end of the piston 1814 extends into a bore formed through the body 1812 and is movable in an axial direction to extend further into the bore of the body 1812 as needed to facilitate rotation of the ball 1610. An opposite end of the piston 1814 engages the ball 1610. The bore 1816 through the piston 1814 forms a portion of the fluid passage (e.g., 1800 of FIG. 19).

The biasing mechanism 1818 may be disposed between the piston 1814 and the body 1812 and configured to bias the piston 1814 in the direction of the ball 1610 to keep the end of the piston 1814 engaged with the ball 1610. The piston 1814 is axially movable relative to the body 1812 and second fluid passage 1800, and the piston 1814 is held in a floating engagement against the ball 1610 via the biasing mechanism 1818 disposed between the body 1812 and the piston 1814. As the ball 1610 is rotated, the movement of the ball 1610 against the piston 1814 may cause the piston 1814 to be moved axially through the body 1812 so as to enable easier movement of the ball 1610 between the open and closed positions, since once in the open or closed position the ball 1610 is sealingly engaged with the seat 1608. The biasing mechanism 1818 may return the piston 1814 to its initial position engaged with the ball 1610 once the ball 1610 is finished rotating.

Figure 20:
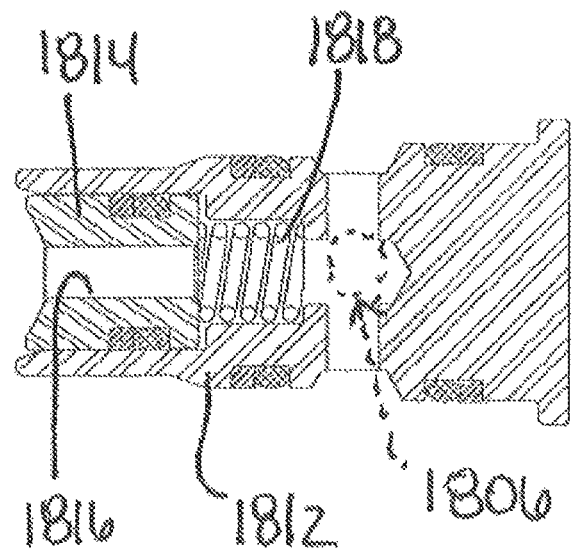
FIG. 20 is a cross sectional view of a ball rotation assembly that may be used in the ball valve assembly of FIG. 19, according to one or more aspects of the present disclosure.

Other types and arrangements of ball rotation assemblies 1810 may be used in other embodiments of the ball valve assembly 1600. For example, FIG. 20 illustrates another embodiment of the ball rotation assembly 1810. In this embodiment, the ball rotation assembly 1810 still includes a body 1812, a piston 1814 with a bore 1816, and a basing mechanism 1818. In FIG. 20, the biasing mechanism is a spring disposed between the end of the piston 1814 and a shoulder on the body 1812.

The disclosed ball valve assembly 1600 may control the selective opening and closing of a communication port within a component such as a gasket retention assembly of a subsea tubular component. The ball valve assembly 1600 allows the communication port to vent fluid pressure to the fluid storage mechanism 1602 (e.g., accumulator) when the ball valve is open, and to prevent pressure communication through the port when the ball valve is closed. In this way, the ball valve assembly 1600 provides an entirely closed system for venting and returning fluid pressure to the communication port without exposing the communication port to external fluid. The gasket retention system is therefore able to be operated without any issues related to fines or solid particles from external fluid clogging the communication port or exposure of internal components to corrosive materials.

It should be noted that the disclosed ball valve assembly 1600 comprising an on board fluid storage mechanism 1602 may be utilized in other contexts than those involving a gasket retention system. For example, the ball valve assembly 1600 may be used within downhole control valve systems where control fluid is typically pumped in and out. The fluid storage mechanism 1602 in the ball valve assembly 1600 may allow for supplying fluid for various functions downhole or controlling fluid build-up within control valve systems.

Although specific embodiments of the invention have been described herein in some detail, it is to be understood that this has been done solely for the purposes of describing the various aspects of the invention, and is not intended to limit the scope of the invention as defined in the claims which follow. Those skilled in the art will understand that the embodiment shown and described is exemplary and various other substitutions, alterations, and modifications, including but not limited to those design alternatives specifically discussed herein, may be made in the practice of the invention without departing from the spirit and scope of the invention.

What is claimed is:

1. A system, comprising:
   a tubular member with a fluid communication port formed therethrough;
   a ball valve assembly coupled to the tubular member, the ball valve assembly comprising:
   a housing comprising a first fluid passage, wherein a first portion of the first fluid passage is fluidly coupled to the fluid communication port in the tubular member;
   a seat disposed within the first fluid passage;
   a ball with a bore formed therethrough, wherein the ball is positioned in the seat and rotatably movable between an open position allowing flow through the first fluid passage and a closed position preventing flow through the first fluid passage; and
   an accumulator disposed in the housing and fluidly coupled to a second portion of the first fluid passage located on an opposite side of the seat from the first portion; and
   a gasket retention assembly configured to selectively retain a gasket in engagement with the tubular member, wherein the fluid communication port extends through the tubular member to vent fluid pressure from the gasket retention assembly to the ball valve assembly, wherein the ball valve assembly is disposed at an end of the fluid communication port, wherein the gasket retention assembly comprises the fluid communication port and a plunger configured to selectively engage the gasket.

2. The system of claim 1, wherein the housing comprises at least one remote operated vehicle (ROV) stab interface fluidly coupled to the first fluid passage.

3. The system of claim 2, wherein the ROV stab interface is fluidly coupled to the first portion of the first fluid passage when the ball is in the open position.

4. The system of claim 2, wherein the ROV stab interface is fluidly coupled to the first portion of the first fluid passage when the ball is in the closed position.

5. The system of claim 1, wherein the housing further comprises a second fluid passage, wherein the ball in the closed position allows flow through the second fluid passage.

6. The system of claim 5, wherein a first portion of the second fluid passage on a third side of the seat is fluidly coupled to the first portion of the first fluid passage.

7. The system of claim 1, wherein the valve assembly further comprises a valve actuator configured to rotate the ball within the seat to transition the ball between the open and closed positions.

8. The system of claim 7, wherein the valve assembly further comprises a ball rotation assembly that facilitates smooth transition of the ball between the open and closed positions in response to rotation of the ball by the valve actuator.

9. The system of claim 1, wherein the ball is movable between the open position allowing venting of pressure or fluid from the communication port to the accumulator and the closed position trapping pressure within the communication port.

10. A ball valve assembly, comprising:
    a housing comprising a first fluid passage;
    a seat disposed within the first fluid passage;

an inlet of the first fluid passage on a first side of the seat for fluidly coupling the ball valve assembly to an external fluid communication line;

a ball with a bore formed therethrough, wherein the ball is positioned in the seat and rotatably movable between an open position allowing flow through the first fluid passage and a closed position preventing flow through the first fluid passage;

an accumulator disposed in the housing and fluidly coupled to the first fluid passage on a second side of the seat opposite the first side; and a ball rotation assembly configured to facilitate rotation of the ball between the open and closed positions, wherein an end of a piston of the ball rotation assembly is configured to be held in a floating engagement with the ball.

11. The ball valve assembly of claim 10, wherein the housing comprises an ROV stab interface fluidly coupled to the first fluid passage on the second side of the seat.

12. The ball valve assembly of claim 10, wherein the housing comprises a second fluid passage, wherein the ball in the closed position allows flow through the second fluid passage.

13. The ball valve assembly of claim 12, wherein:
the first fluid passage comprises a first portion on the first side of the seat and a second portion on the second side of the seat;
the second fluid passage comprises a first portion on a third side of the seat and a second portion on a fourth side of the seat; and
the first portion of the second fluid passage is fluidly coupled to the first portion of the first fluid passage.

14. The ball valve assembly of claim 13, wherein the housing comprises an ROV stab interface fluidly coupled to the second portion of the second fluid passage.

15. The ball valve assembly of claim 12, wherein the ball rotation assembly is disposed in the second fluid passage.

16. The ball valve assembly of claim 15, wherein the ball rotation assembly comprises a body and the piston disposed in the body, wherein the body and the piston each comprise a bore formed therethrough, wherein the piston is axially movable relative to the housing and the second fluid passage, and wherein the piston is held in the floating engagement against the ball via a biasing mechanism disposed between the housing and the piston, wherein the biasing mechanism is a spring.

17. The ball valve assembly of claim 10, wherein the accumulator is a nitrogen accumulator.

18. The ball valve assembly of claim 10, further comprising a valve actuator configured to rotate the ball within the seat to transition the ball between the open and closed positions.

19. The ball valve assembly of claim 18, wherein the valve actuator comprises a lever, wherein the lever extends from the housing and is operable via an ROV.

20. A method, comprising:
receiving a pressure increase through a port in a tubular member, wherein the tubular member is coupled to a ball valve assembly, the ball valve assembly comprising:
a housing comprising a first fluid passage, wherein the first fluid passage is fluidly coupled to the port in the tubular member;
a seat disposed in the first fluid passage;
a ball with a bore formed therethrough, wherein the ball is rotatably movable between an open position allowing flow through the first fluid passage and a closed position preventing flow through the first fluid passage; and
an accumulator coupled to the first fluid passage on an opposite side of the seat from the port;
transferring the pressure increase through the first fluid passage to the accumulator;
compressing a piston of the accumulator in response to the pressure increase;
closing the ball valve assembly to trap pressure within the port;
moving the tubular member while the ball valve assembly is closed; and
maintaining a position of a component within the port during movement of the tubular member via the trapped pressure in the port.

21. The method of claim 20, wherein the component within the port is a gasket retention mechanism.

22. The method of claim 20, further comprising:
opening the ball valve assembly;
moving the tubular member while the ball valve assembly is open; and
allowing the component to move axially within the port during movement of the tubular member.

23. The method of claim 20, further comprising coupling an ROV to a stabbing interface of the ball valve assembly, and routing pressurized fluid from the ROV into the port via the ball valve assembly while the ball valve assembly is open.

24. The method of claim 20, further comprising coupling an ROV to a stabbing interface of the ball valve assembly, and routing pressurized fluid from the ROV into the port via the ball valve assembly while the ball valve assembly is closed.

* * * * *